US012487554B2

(12) United States Patent
Chen et al.

(10) Patent No.: US 12,487,554 B2
(45) Date of Patent: Dec. 2, 2025

(54) DEVELOPING AGENT CONTAINER AND IMAGING DEVICE

(71) Applicant: Guangzhou Zhono Microelectronics Co., Ltd., Guangdong (CN)

(72) Inventors: Famiao Chen, Guangzhou (CN); Shaocong Luo, Guangzhou (CN); Zhenbiao Huang, Guangzhou (CN)

(73) Assignee: Guangzhou Zhono Microelectronics Co., Ltd., Guangdong (CN)

( * ) Notice: Subject to any disclaimer, the term of this patent is extended or adjusted under 35 U.S.C. 154(b) by 0 days.

(21) Appl. No.: 18/825,136

(22) Filed: Sep. 5, 2024

(65) Prior Publication Data

US 2025/0076809 A1 Mar. 6, 2025

(30) Foreign Application Priority Data

Sep. 6, 2023 (CN) ........................ 202311147546.5

(51) Int. Cl.

| | |
|---|---|
| ***G03G 15/06*** | (2006.01) |
| ***G03G 15/08*** | (2006.01) |
| ***G03G 21/16*** | (2006.01) |

(52) U.S. Cl.

CPC ..... *G03G 21/1676* (2013.01); *G03G 15/0808* (2013.01); *G03G 15/0872* (2013.01); *G03G 2215/0665* (2013.01); *G03G 2221/163* (2013.01)

(58) Field of Classification Search

CPC ........... G03G 15/0808; G03G 15/0872; G03G 21/1676

USPC ......................... 399/111, 222, 252, 258, 262

See application file for complete search history.

(56) References Cited

U.S. PATENT DOCUMENTS 9,285,758 B1 * 3/2016 Boettcher .......... G03G 21/1647

FOREIGN PATENT DOCUMENTS

KR 20150138432 * 12/2015

* cited by examiner

*Primary Examiner* — Hoan H Tran

(74) *Attorney, Agent, or Firm* — Gunther J. Evanina; BUTZEL LONG

(57) ABSTRACT

A photographic developer container can be detachably mounted to a photographic developer receiving portion located within an image-forming apparatus. The photographic developer receiving portion includes a receiving opening, a binding portion, and an abutting portion. The photographic developer container includes a photographic developer discharge portion arranged with a discharge opening configured for discharging the photographic developer of the photographic developer container body; a photographic developer blocking portion arranged with a hole; and a lifting portion.

11 Claims, 24 Drawing Sheets

DEVELOPING AGENT CONTAINER AND IMAGING DEVICE

CROSS-REFERENCE TO RELATED APPLICATION

The present disclosure claims priority to Chinese patent application No. 2023111475465 filed with the China National Intellectual Property Administration on Sep. 6, 2023, entitled "DEVELOPING AGENT CONTAINER AND IMAGING DEVICE", the entire contents of which are incorporated herein by reference.

TECHNICAL FIELD

The present disclosure relates to the technical field of printing consumables, and in particular to a photographic developer container (i.e., a developing agent container) and an image-forming apparatus (i.e., an imaging device).

BACKGROUND ART

In the image-forming apparatus, it typically uses a finer toner-photographic developer as the medium for forming images on recording material. Since the photographic developer is usually stored in the corresponding photographic developer container, during the continuous process of electronic imaging, the photographic developer will be depleted gradually. This requires the user to replace the photographic developer container or refill the photographic developer to ensure the normal operation of the image-forming apparatus.

The image-forming apparatus is therein provided with a photographic developer receiving portion, and the photographic developer container can be detachably mounted on the photographic developer receiving portion. Each time the user mounts or dismounts the photographic developer container, the discharge opening on the photographic developer container will be communicated with or disconnected from the receiving opening of the photographic developer receiving portion.

In the prior art, as shown in FIG. 1, FIG. 1 is a schematic diagram of a structure of a photographic developer receiving device containing a photographic developer receiving portion 11 in the prior art, where arrow A in FIG. 1 indicates the mounting direction of the photographic developer container, and arrow B indicates the dismounting direction of the photographic developer container. FIG. 1 includes a photographic developer receiving device 8, wherein the photographic developer receiving device 8 includes a mounting portion 8*f*, first and second stopping portions 8*a*/8*b*, and a photographic developer receiving portion 11.

As shown in FIG. 2, FIG. 2 is a schematic diagram of a structure of the photographic developer receiving portion 11. The photographic developer receiving portion 11 is provided with a receiving opening 11*a*, a binding portion 11*b*, an abutting portion (not labeled in the figure), and a scaling component 13.

As shown in FIG. 3, FIG. 3 is a schematic diagram of a structure of a flange portion 3, where it includes an engaging portion 30, and the engaging portion 30 is provided with a curved part 3*b* and a parallel part 3*c*.

As shown in FIGS. 4-5, FIG. 4 is a sectional view of the photographic developer receiving portion 11 as the photographic developer container is inserted in state A, and FIG. 5 is a sectional view of the photographic developer receiving portion 11 as the photographic developer container is inserted in state B.

When the photographic developer container is mounted into the image-forming apparatus containing the photographic developer receiving portion 11, the hole 4*j* of the blocking part 4 will move in the A direction above the receiving opening 11*a*. The engaging portion 30, composed of the curved part 3*b* and the parallel part 3*c*, will also gradually move towards the interior of the image-forming apparatus, and the binding portion 11*b* will precisely snap into the engaging portion 30, thereby causing the photographic developer receiving portion 11 to be lifted to the hole 4*j*. Simultaneously, the flange portion 3 will also move towards the interior of the image-forming apparatus relative to the blocking part 4. Using the blocking part 4 and the first and second stopping portions 8*a*/8*b* enables the hole 4*j* on the baffle and the receiving opening 11*a* of the photographic developer receiving portion 11 to be always located on the same vertical line. The photographic developer container is continuously pushed until the discharge opening 3*a*4 on the flange portion 3, the hole 4*j*, and the receiving opening 11*a* are located on the same vertical line. At this time, the photographic developer container can achieve a communicating state with the photographic developer receiving portion 11, allowing the photographic developer inside the photographic developer container to flow into the photographic developer receiving portion 11. Therefore, it ensures the normal operation of the image-forming apparatus.

However, because the photographic developer container needs to be frequently mounted and dismounted, the binding portion 11*b* and the engaging portion 30 that is composed of the curved part 3*b* and the parallel part 3*c* are frequently rubbed, especially between the binding portion 11*b* and the curved part 3*b*. This is highly likely to cause surface wear or even breakage of the engaging portion 11*b* or the curved part 3*b*, which would lead to the discharge opening 3*a*4 of the photographic developer container and the hole 4*j* failing to communicate with the receiving opening 11*a* of the photographic developer receiving portion 11, resulting in photographic developer leakage and causing the electrophotography imaging apparatus to be unable to print normally.

SUMMARY

The present disclosure provides a photographic developer container and an image-forming apparatus to solve the problem in the related art where frequent mounting and dismounting of the photographic developer container leads to photographic developer leakage, causing the electrophotography imaging apparatus to be unable to print normally.

The present disclosure provides a photographic developer container, wherein the photographic developer container can be detachably mounted to a photographic developer receiving portion located within an image-forming apparatus. The photographic developer receiving portion includes a receiving opening for receiving photographic developer, a binding portion capable of integrally displacing with the photographic developer receiving portion, and an abutting portion that supports the binding portion. The photographic developer container includes: a photographic developer container body configured for containing photographic developer and capable of rotating around a first rotation axis; a photographic developer discharge portion arranged with a discharge opening configured for discharging the photographic developer of the photographic developer container body; a photographic developer blocking portion arranged with a hole that can communicate with the discharge opening and configured to open and close the discharge opening along with a mounting and dismounting operation of the photographic developer container; a displacement portion extending along a first direction of the photographic developer discharge portion; a guiding portion extending along a second direction of the photographic developer discharge portion; and a lifting portion capable of cooperating with the photographic developer receiving portion, such that the lifting portion moves a predetermined distance in the first direction, and the lifting portion rotates around itself at a predetermined angle, causing the receiving opening to fluidly communicate with the discharge opening.

The present disclosure also provides an image-forming apparatus comprising a photographic developer receiving portion and the photographic developer container as described above. The photographic developer container is detachably mounted on the photographic developer receiving portion.

After adopting the above technical solution, when the photographic developer container is mounted into the image-forming apparatus, the lifting portion can cooperate with the binding portion to cause an overall displacement relative to the photographic developer container, to allow the receiving opening to communicate with the discharge opening. Since the binding portion only presents in a rotating state relative to the lifting portion during the displacement process, the binding portion does not move a long distance relative to the lifting portion, thus reducing the possibility of surface wear or even breakage due to frequent friction between the binding portion and the lifting portion. This prevents the discharge opening and the hole of the photographic developer container from failing to communicate with the receiving opening of the photographic developer receiving portion, thereby avoiding photographic developer leakage, which could ultimately lead to the image-forming apparatus failing to print properly.

BRIEF DESCRIPTION OF DRAWINGS

FIG. 6(*b*) is a schematic structural diagram of a second structure of a photographic developer container according to the present disclosure;

FIG. 6(*c*) is a schematic structural diagram of a third structure of a photographic developer container according to the present disclosure;

FIG. 7(*b*) is a schematic structural diagram of a lifting portion and a photographic developer receiving portion cooperated in a second state of the photographic developer container according to the present disclosure;

FIG. 7(*c*) is a schematic structural diagram of a lifting portion and a photographic developer receiving portion cooperated in a third state of the photographic developer container according to the present disclosure;

FIG. 8(*b*) is a schematic diagram of a second structure of the lifting portion of the photographic developer container according to some embodiments of the present disclosure;

FIG. 8(*c*) is a schematic diagram of a third structure of the lifting portion of the photographic developer container according to some embodiments of the present disclosure;

FIG. 8(*d*) is a schematic diagram of a fourth structure of the lifting portion of the photographic developer container according to some embodiments of the present disclosure;

FIG. 9(*b*) is a schematic structural diagram of the discharge opening, the hole, and the receiving opening cooperated in a second state of the photographic developer container according to the present disclosure;

FIG. 9(*c*) is a schematic structural diagram of the discharge opening, the hole, and the receiving opening cooperated in a third state of the photographic developer container according to the present disclosure;

FIG. 10(*b*) is a schematic structural diagram of a movement and rotation states of a binding portion and a driving portion in a second state of the photographic developer container according to the present disclosure;

FIG. 10(*c*) is a schematic structural diagram of a movement and rotation states of a binding portion and a driving portion in a third state of the photographic developer container according to the present disclosure;

FIG. 11(*b*) is a schematic diagram of a second structure of a photographic developer blocking portion of a photographic developer container according to the present disclosure;

FIG. 12(*b*) is a schematic diagram of a second structure of a lifting portion of a photographic developer container being mounted to the photographic developer discharge portion according to some embodiments of the present disclosure;

FIG. 12(*c*) is a schematic diagram of a third structure of a lifting portion of a photographic developer container being mounted to the photographic developer discharge portion according to some embodiments of the present disclosure;

FIG. 13(*b*) is a schematic diagram of a second structure of a lifting portion of a photographic developer container being mounted to the photographic developer discharge portion according to some other embodiments of the present disclosure;

FIG. 13(*c*) is a schematic diagram of a third structure of a lifting portion of a photographic developer container being mounted to the photographic developer discharge portion according to some other embodiments of the present disclosure;

FIG. 15(*b*) is a schematic structural diagram of a lifting portion and a photographic developer receiving portion cooperated in a first state according to some other embodiments of the present disclosure;

FIG. 16(*b*) is a schematic diagram of a second structure of a lifting portion of a photographic developer container being mounted to the photographic developer discharge portion according to some other embodiments of the present disclosure;

FIG. 16(*c*) is a schematic diagram of a third structure of a lifting portion of a photographic developer container being mounted to the photographic developer discharge portion according to some other embodiments of the present disclosure;

FIG. 18(*b*) is a schematic structural diagram of a lifting portion and a photographic developer receiving portion cooperated in a third state according to some other embodiments of the present disclosure;

FIG. 20(*b*) is a schematic diagram of a second structure of a photographic developer blocking portion and a photographic developer discharge portion according to some embodiments of the present disclosure;

FIG. 21(*b*) is a schematic structural diagram of a lifting portion cooperating with a guiding portion according to some embodiments of the present disclosure.

REFERENCE NUMERALS

Figure 1:
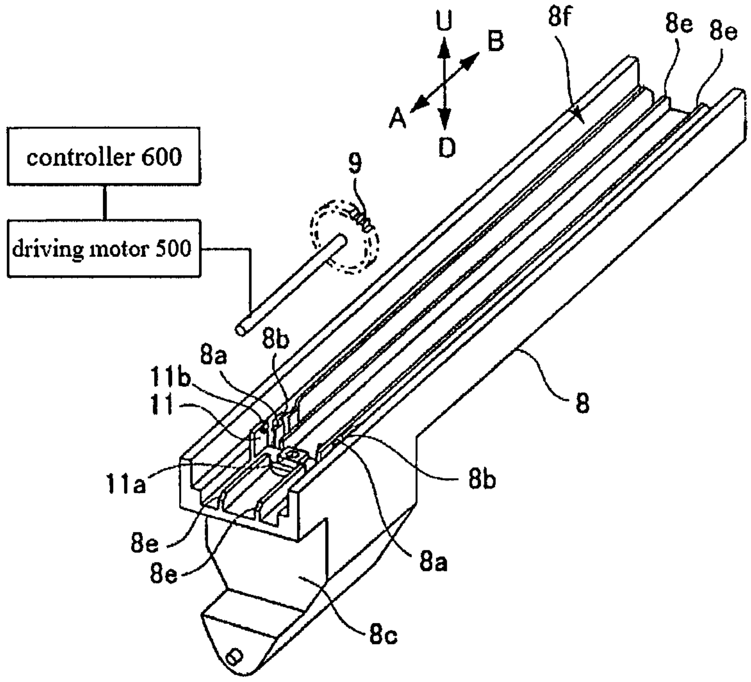
FIG. 1 is a schematic structural diagram of a photographic developer receiving apparatus containing a photographic developer receiving portion in the prior art.
Figure 2:
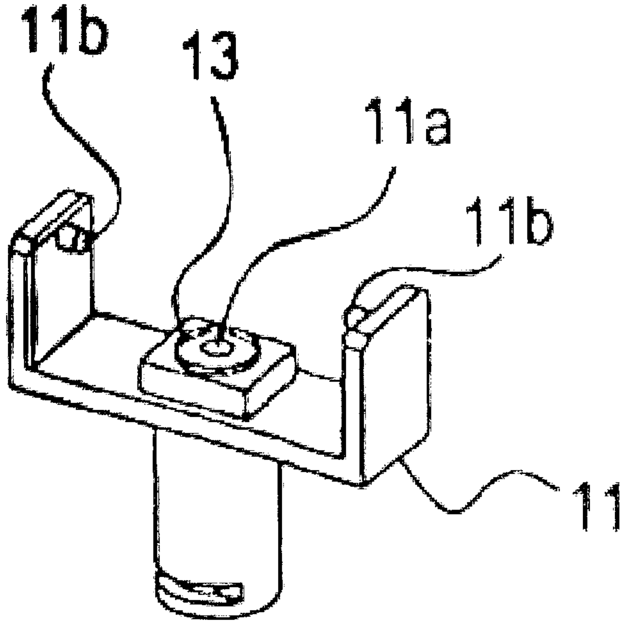
FIG. 2 is a schematic structural diagram of a photographic developer receiving portion.
Figure 3:
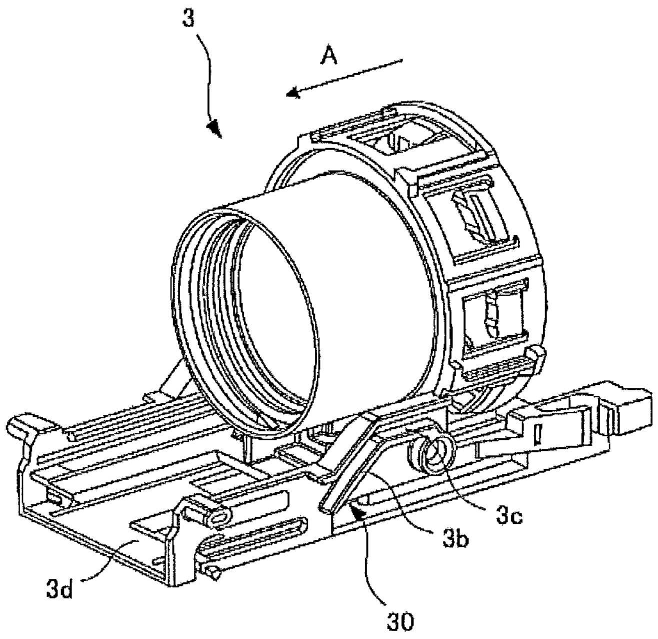
FIG. 3 is a schematic structural diagram of a flange portion.
Figure 4:
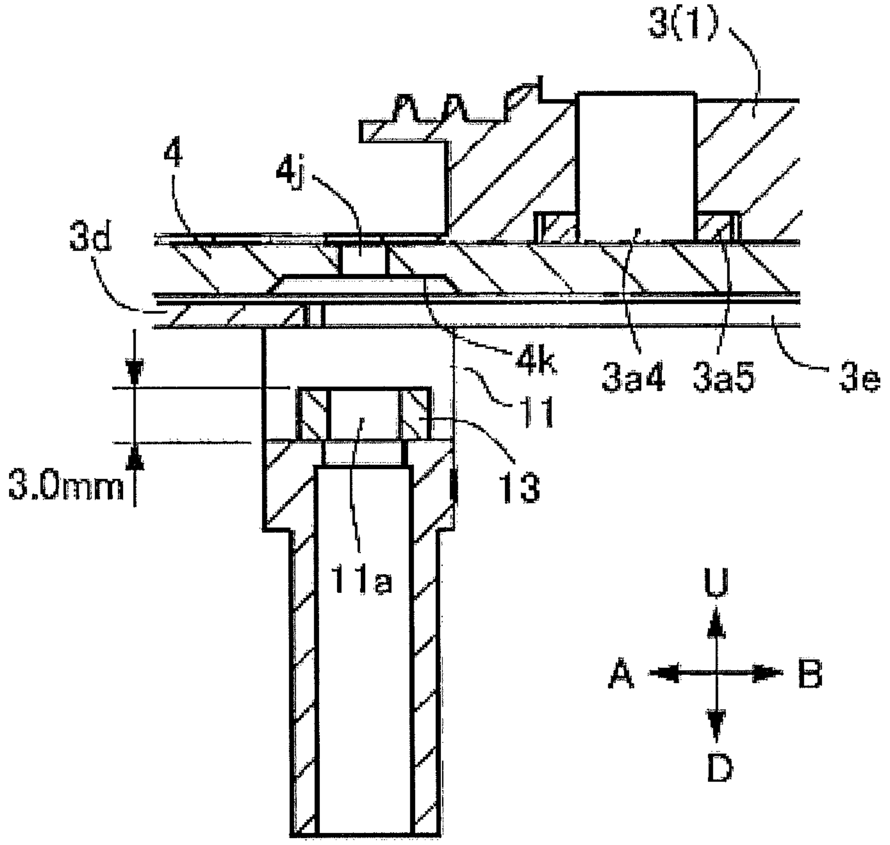
FIG. 4 is a sectional view of a photographic developer receiving portion in state A as a photographic developer container is inserted.
Figure 5:
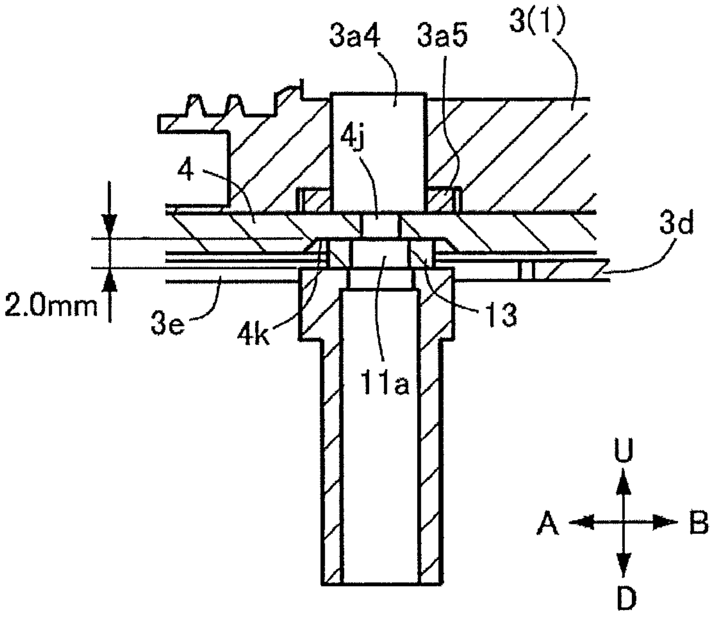
FIG. 5 is a sectional view of a photographic developer receiving portion 11 in state B as a photographic developer container is inserted.

10—photographic developer container;
1—photographic developer container body; 11—opening;
2—photographic developer pushing portion;
3—photographic developer discharge portion; 3*a*—guiding portion; 3*b*—curved part; 3*c*—connecting portion; 3*d*—displacement portion; 3*e*—stopper hole; 3*f*—cavity; 3*g*—discharge opening;
31—lifting portion; 31*a*—guide part; 31*al*—starting surface; 31*a*2—guiding surface; 31*a*3—ending surface; 31*a*4—restriction surface; 31*a*5—contact surface; 31*b*—wall; 31*c*—engaging portion; 31*c*1—first engaging surface; 31*cc*—second engaging surface; 31*c*2—second sub-engaging surface; 31*c*2*a*—engaging hole; 31*c*3—second sub-engaging surface; 31*c*4—adjacent surface; 31*d*1—driving portion in the first state; 31*d*1'—driving portion in the second state; 31*d*1"—driving portion in the third state; 31*d*2—limiting part; 31*d*3—pushing portion; 31*d*4—snapping part;
32—resetting portion;
4—photographic developer blocking portion;
41—blocking part; 41*a*—hole; 41*b*—connecting surface; 41*c*—pushing member;
42*a*—support part; 42*b*—first stopped part; 42*c*—second stopped part;
43—platform portion; 43*a*—snapped part;
5—housing;
6—photographic developer receiving portion; 61—photographic developer receiving portion main body; 61*a*—receiving opening;
62—abutting portion;
62*a*—binding portion in the first state; 62*a'*—binding portion in the second state; 62*a"*—binding portion in the third state;
62*b*—abutting surface;
71—first stopping part;
72—second stopping part;
A1—first rotation axis;
A2—second rotation axis;
Q1—first vertical line in first state; Q1'—first vertical line in second state; Q"—first vertical line in third state;
Q2—second vertical line;
L1—stroke A;
L2—stroke B;
P1—first section;
P2—second section;
S1—first angle;
S2—second angle;
W—surface; W1—first surface; W2—second surface.

DETAILED DESCRIPTION OF EMBODIMENTS

The technical solutions in the embodiments of the present disclosure will be clearly and completely described below in conjunction with the drawings in the embodiments of the present disclosure. Obviously, the described embodiments are only a part of the embodiments of the present disclosure, and not all of the embodiments. Based on the embodiments in the present disclosure, all other embodiments obtained by those of ordinary skill in the art without making inventive efforts are within the scope of protection of the present disclosure.

Unless otherwise defined, all terms used in the embodiments of the present disclosure (including technical and scientific terms) have the same meaning as commonly understood by those of ordinary skill in the art to which the present disclosure belongs. It should also be understood that terms such as those defined in common dictionaries should be construed as having a meaning consistent with their meaning in the context of the relevant art, and should not be construed with an idealized or extremely formalized meaning unless explicitly defined as such by embodiments of the present disclosure.

In the embodiments of the present disclosure, it should be noted that the orientation or positional relationship indicated by the term "center", "up", "down", "left", "right", "vertical", "horizontal", etc. is based on the orientation or positional relationship shown in the drawings or the orientation or positional relationship in which the product of the present disclosure is customarily placed when used. It is intended only to facilitate the description of the embodiments of the present disclosure and to simplify the description, and not to indicate or imply that the devices or elements referred to must have a particular orientation, be constructed and operated in a particular orientation. Accordingly, it is not to be construed as a limitation of the embodiments of the present disclosure.

The terms "first", "second", and the like as used in embodiments of the present disclosure do not denote any order, quantity, or significance, but are merely used to distinguish between different components. Similar terms such as "a", "an" or "the" also do not indicate a quantitative limitation, but rather the existence of at least one. Similarly, words such as "includes" or "comprises" mean that the element or object preceded by the word encompasses the enumerated element or object followed by the word and its equivalents, without excluding other elements or objects. Terms such as "connected" or "interconnected" are not limited to physical or mechanical connections, but may include electrical connections, whether direct or indirect. The steps preceding or following the method of embodiments of the present disclosure do not necessarily follow an exact sequence. Instead, various steps can be processed in reverse order or simultaneously. It is also possible to add other operations to these processes or to remove a step or steps from them.

The present disclosure provides at least one embodiment of a photographic developer container, which can be removably mounted to a photographic developer receiving portion located within an image-forming apparatus. The photographic developer receiving portion includes a receiving opening for receiving photographic developer, a binding portion capable of integrally displacing with the photographic developer receiving portion, and an abutting portion that supports the binding portion. The photographic developer container includes: a photographic developer container body configured for containing photographic developer and capable of rotating around a first rotation axis; a photographic developer discharge portion arranged with a discharge opening configured for discharging the photographic developer of the photographic developer container body; a photographic developer blocking portion arranged with a hole that can communicate with the discharge opening and configured to open and close the discharge opening along with the mounting and dismounting operation of the photographic developer container; a displacement portion that extends along a straight line parallel to a first direction of the photographic developer container; a guiding portion that extends along a straight line parallel to a second direction of the photographic developer discharge portion; and a lifting portion capable of cooperating with the photographic developer receiving portion, such that a moving end of the lifting portion moves a predetermined distance in the first direction, and a rotating end of the lifting portion rotates a predetermined angle around a second rotation axis, causing the receiving opening to fluidly communicate with the discharge opening.

The photographic developer container of the above embodiment of the present disclosure, when the photographic developer container is mounted into the image-forming apparatus, the lifting portion can cooperate with the binding portion to cause an overall displacement relative to the photographic developer container, to allow the receiving opening to communicate with the discharge opening. Since the binding portion only presents in a rotating state relative to the lifting portion during the displacement process, the binding portion does not move a long distance relative to the lifting portion, thus reducing the possibility of surface wear or even breakage due to frequent friction between the binding portion and the lifting portion. This prevents the discharge opening and the hole of the photographic developer container from failing to communicate with the receiving opening of the photographic developer receiving portion, thereby avoiding photographic developer leakage, which could ultimately lead to the image-forming apparatus failing to print properly.

The following describes the embodiments and examples of the present disclosure in detail in conjunction with the drawings.

The mounting and dismounting direction of the photographic developer container 10 is defined as the first direction X, wherein the first rotation axis A1 is parallel to the first direction X.

The width of the housing 5 of the photographic developer container, in the direction perpendicular to the first direction X, is defined as the second direction Y, wherein the second rotation axis A2 is parallel to the first direction Y.

The height of the housing 5 of the photographic developer container, in the directions perpendicular to both the first direction X and the second direction Y, is defined as the third direction Z.

In the first direction X, the end of the photographic developer container 10 close to the image-forming apparatus (not shown in the figure) is the end portion for receiving power and delivering photographic developer, and the end of the photographic developer container 10 away from the image-forming apparatus is the end portion for storing the photographic developer.

Figure 6A:
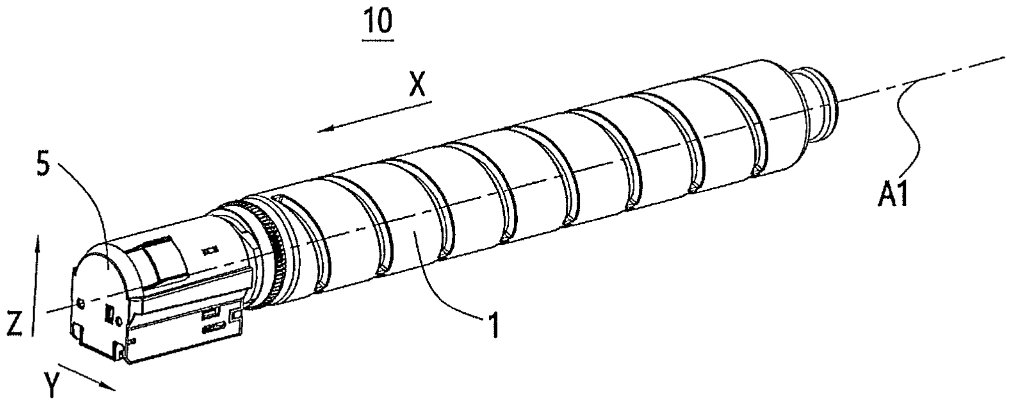
FIG. 6(*a*) is a schematic structural diagram of a first structure of a photographic developer container according to the present disclosure.
Figure 6B:
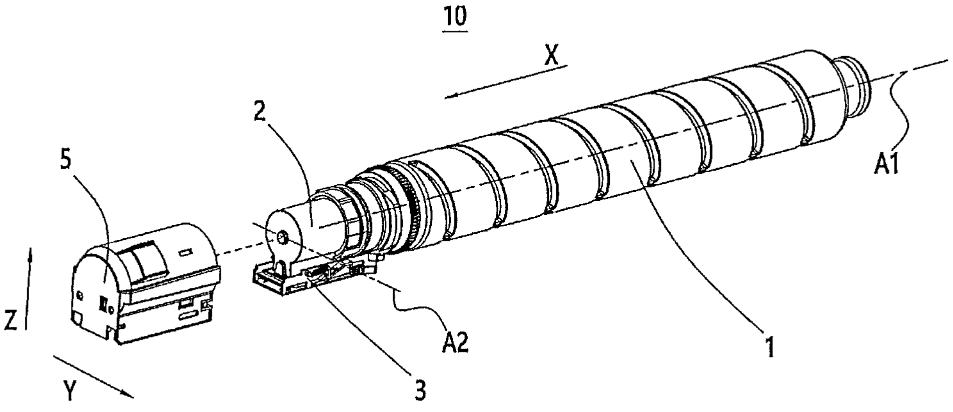
Figure 6C:
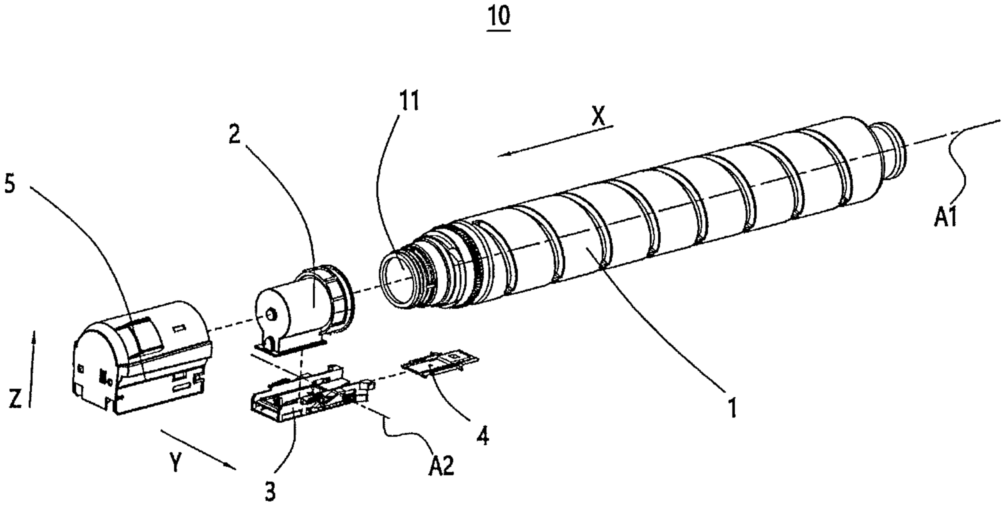

As shown in FIGS. 6(*a*)-6(*c*), the image-forming apparatus includes a photographic developer receiving portion 6, and the photographic developer container 10 is detachably mounted to the photographic developer receiving portion 6. First, the driving force is transmitted from the image-forming apparatus to the power-receiving end (not shown in the figure) of the photographic developer container 10, to facilitate rotation of the photographic developer container body 1 by the driving force around the first rotation axis A1 in the first direction X. Since the photographic developer container body 1 is provided with a spiral structure, it allows the photographic developer inside the photographic developer container body 1 to be discharged from the opening 11. That is to say, the photographic developer container body 1 can rotate relative to the housing 5 and the photographic developer discharge portion 3 located inside the housing 5, thus allowing the photographic developer to be discharged while the photographic developer container body 1 is in a rotating state.

To further smoothly deliver the photographic developer inside the photographic developer container body 1 to the photographic developer discharge portion 3, as shown in FIGS. 6(*b*) and 6(*c*), the opening 11 of the photographic developer container body 1 is also provided with a photographic developer pushing portion 2. The input end of the photographic developer pushing portion 2 is connected to the opening 11, and the output end of the photographic developer pushing portion 2 is connected to the photographic developer discharge portion 3. It can be understood that, by the function of the photographic developer pushing portion 2, the photographic developer can be pushed from the photographic developer container body 1 to the photographic developer discharge portion 3, thus completing the pushing of the photographic developer. In the embodiment, the photographic developer pushing portion 2 can use structures such as a pump, or stirring blades capable of pushing the photographic developer, without limitation by the present disclosure.

Figure 20A:
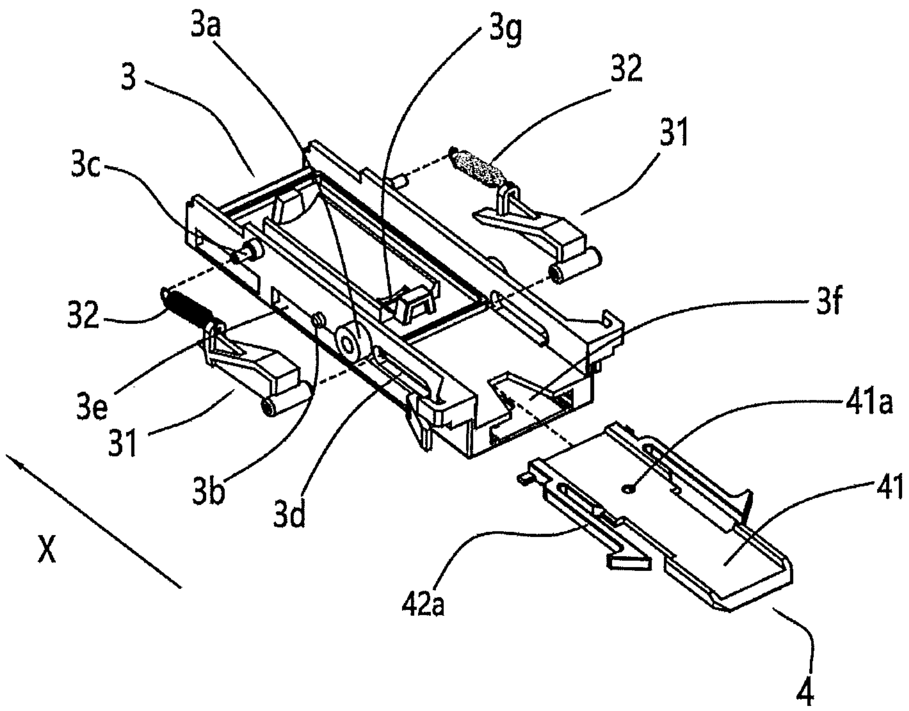
FIG. 20(*a*) is a schematic diagram of a first structure of a photographic developer blocking portion and a photographic developer discharge portion according to some embodiments of the present disclosure.
Figure 20B:
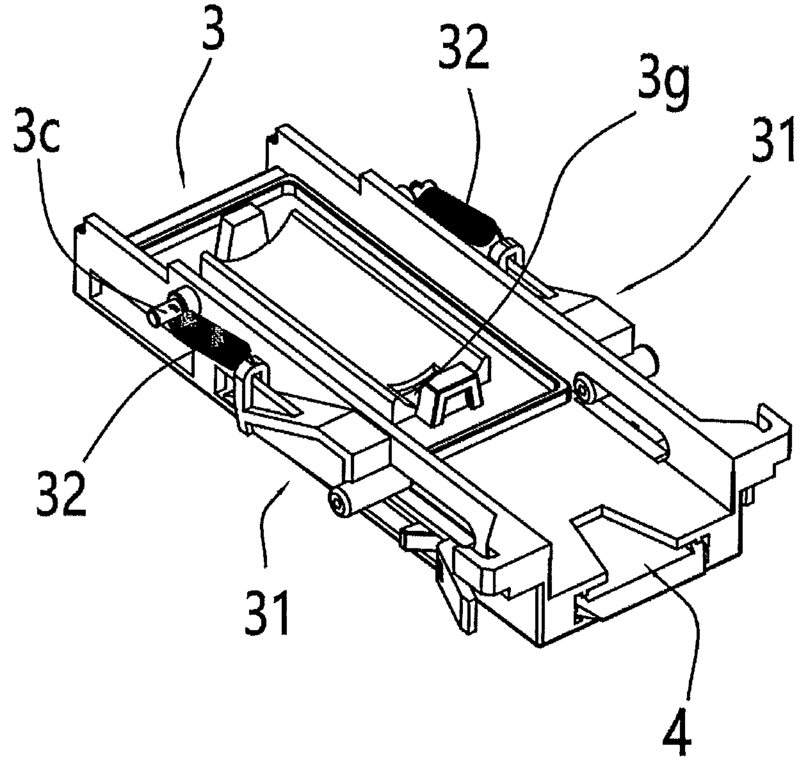

Next, as shown in FIGS. 20(*a*) and 20(*b*), the photographic developer discharge portion 3 at the output end of the photographic developer pushing portion 2 is detachably connected with a photographic developer blocking portion 4. The photographic developer blocking portion 4 cooperates with the first stopping part 71 and the second stopping part 72 inside the image-forming apparatus, so that the photographic developer blocking portion 4 is in communication with the photographic developer receiving portion 6, and then the photographic developer is sequentially pushed by the photographic developer pushing portion 2 to the photographic developer discharge portion 3, the photographic developer blocking portion 4, and finally to the photographic developer receiving portion 6, allowing the image-forming apparatus to receive photographic developer and complete the image forming process.

Figure 10A:
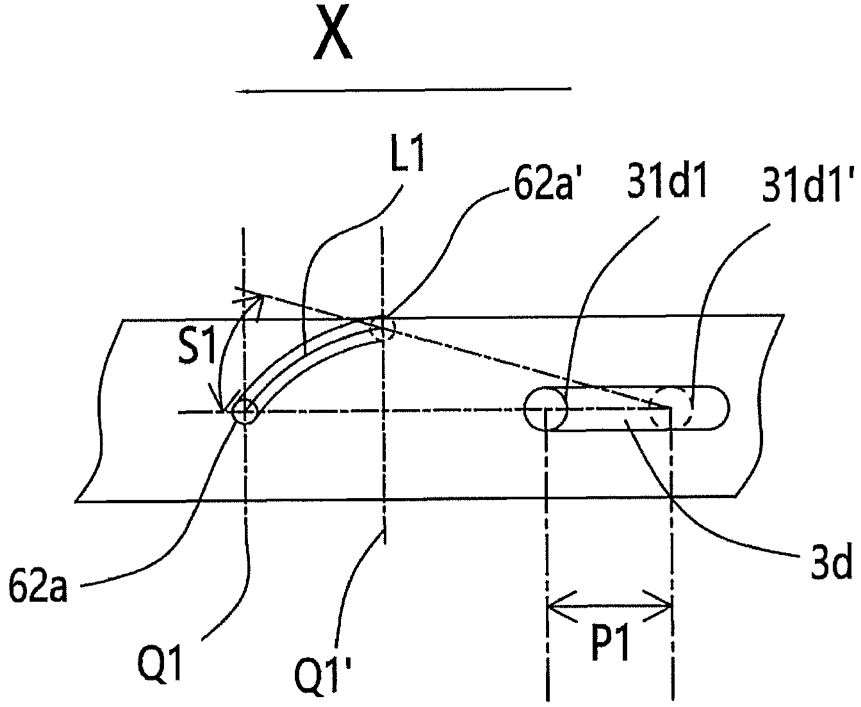
FIG. 10(*a*) is a schematic structural diagram of a movement and rotation states of a binding portion and a driving portion in a first state of the photographic developer container according to the present disclosure.
Figure 10B:
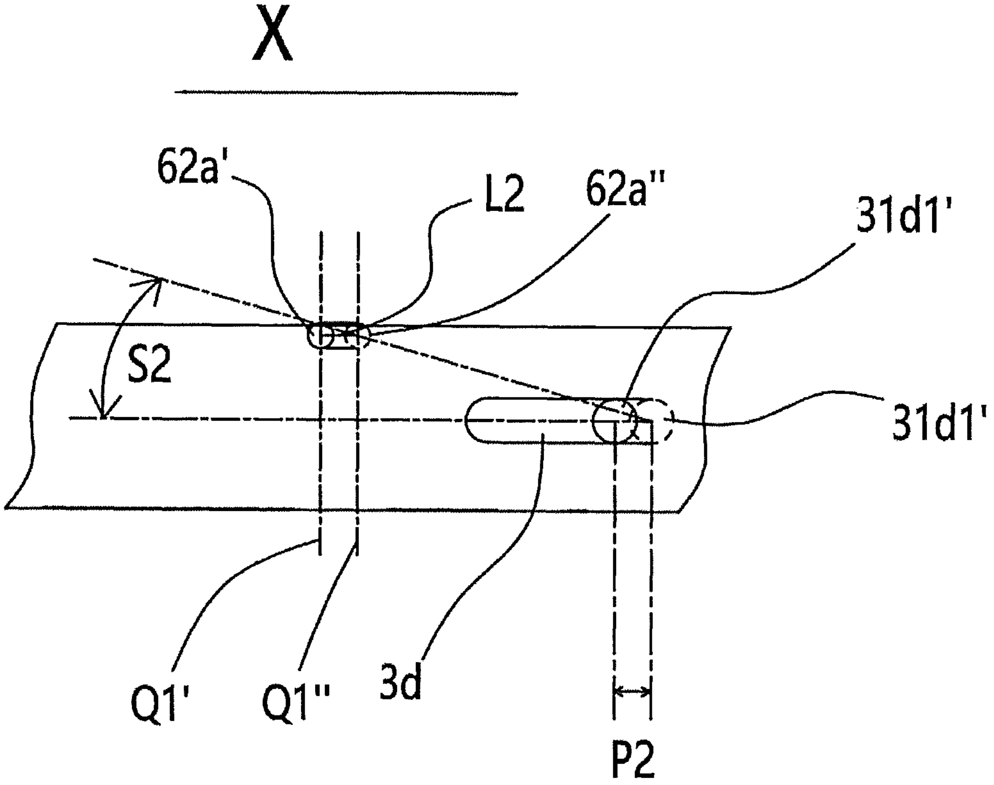
Figure 10C:
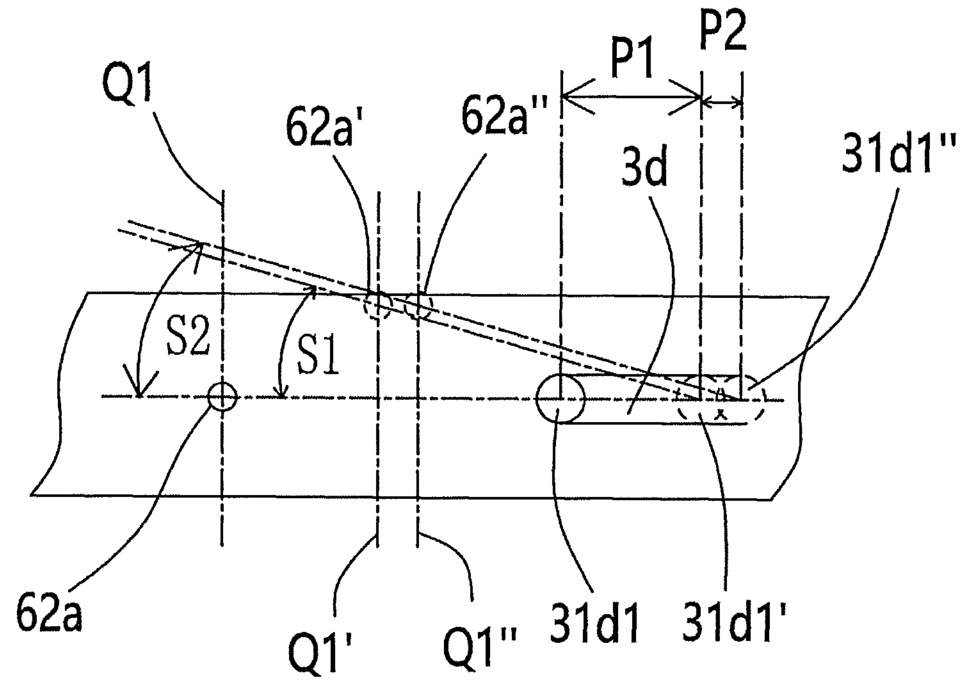

Now, a detailed description is given of the manner in which the photographic developer discharge portion 3, the photographic developer blocking portion 4, and the photographic developer receiving portion 6 combine to accomplish fluid communication of the photographic developer. As shown in FIGS. 10(*a*) and 10(*b*), two sets of lifting portions 31 are mounted on the side portion of the photographic developer discharge portion 3 along the second direction Y. In the embodiment, as shown in FIGS. 20(*a*)-20(*b*), the two sets of lifting portions 31 are mounted in a generally right trapezoidal structure, with one end portion connected to a connecting portion 3*c* extending from the second direction Y in the photographic developer discharge portion 3 through a resetting portion 32, and the other end portion slidably connected to a displacement portion 3*d* extending in the first direction X in the photographic developer discharge portion 3. The resetting portion 32 can provide potential energy to reset when the lifting portion 31 moves away from the resetting portion 32 along the displacement portion 3*d*, so that under appropriate conditions, the lifting portion 31 can reset along the displacement portion 3*d* towards the resetting portion 32.

In the embodiment, the resetting portion 32 is a spring with hooks at both ends. One end portion of the spring is fixed to the connecting portion 3*c* by a hook, and the other end is fixed to an engaging hole 31*c*2*a* on the lifting portion 31 by a hook, thereby providing the lifting portion 31 with a reciprocating effect. The present disclosure is not limited to a spring as the resetting portion 32; any component with a resetting function can be used to reset the lifting portion 31 from the final state to the initial state, where the initial state is the first state when the photographic developer container 10 is not mounted in the image-forming apparatus, and the final state is the third state when the photographic developer container 10 is in fluid communication with the photographic developer receiving portion 6. In some embodiments, the first state can directly switch to the third state, and in other embodiments, the first state needs to switch to the third state via the second state. The specific process of how the first state switches to the third state will be described in detail later.

Figure 7A:
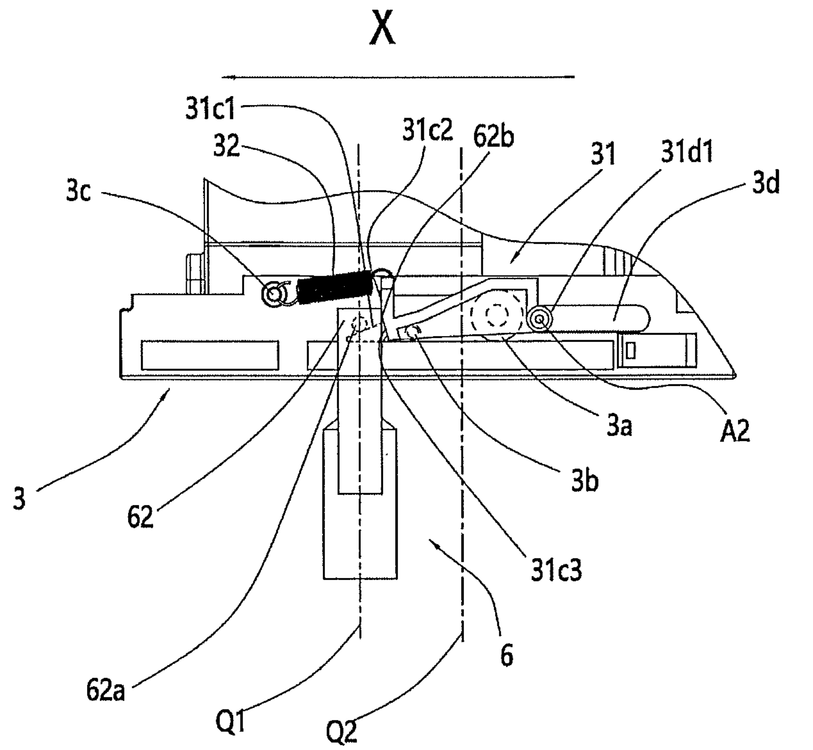
FIG. 7(*a*) is a schematic structural diagram of a lifting portion and a photographic developer receiving portion cooperated in a first state of the photographic developer container according to the present disclosure.
Figure 7B:
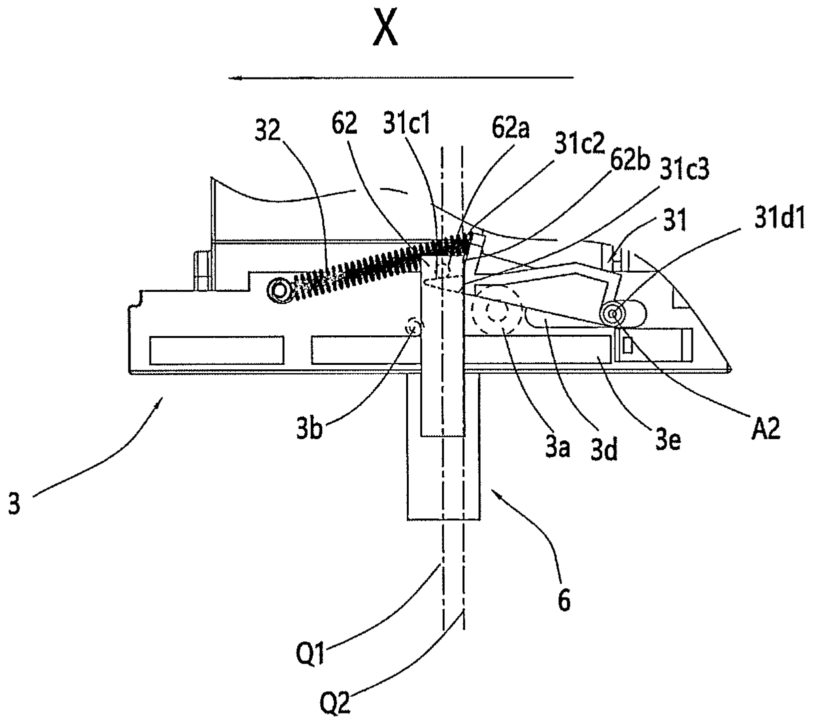
Figure 7C:
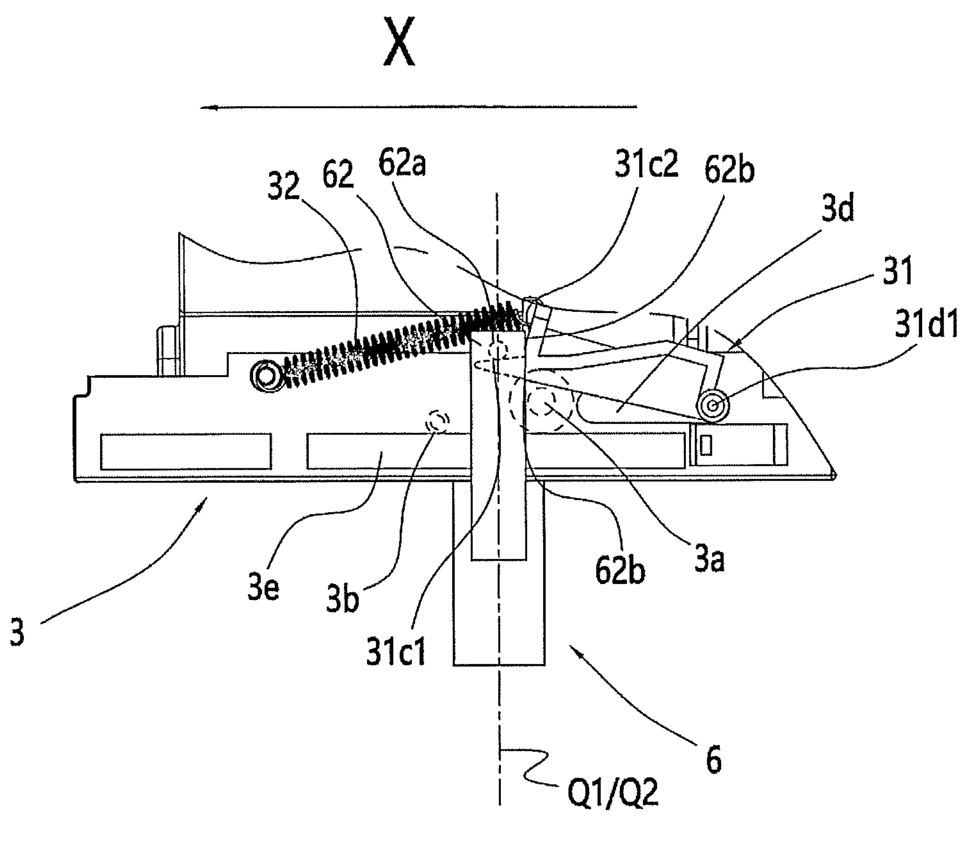
Figure 8A:
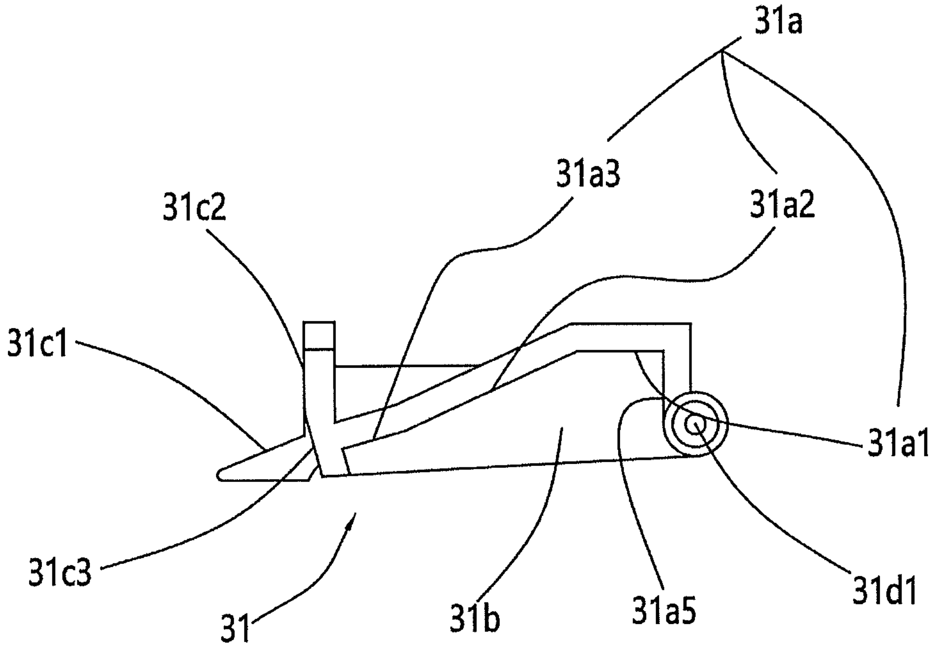
FIG. 8(*a*) is a schematic diagram of a first structure of the lifting portion of the photographic developer container according to some embodiments of the present disclosure.
Figure 8B:
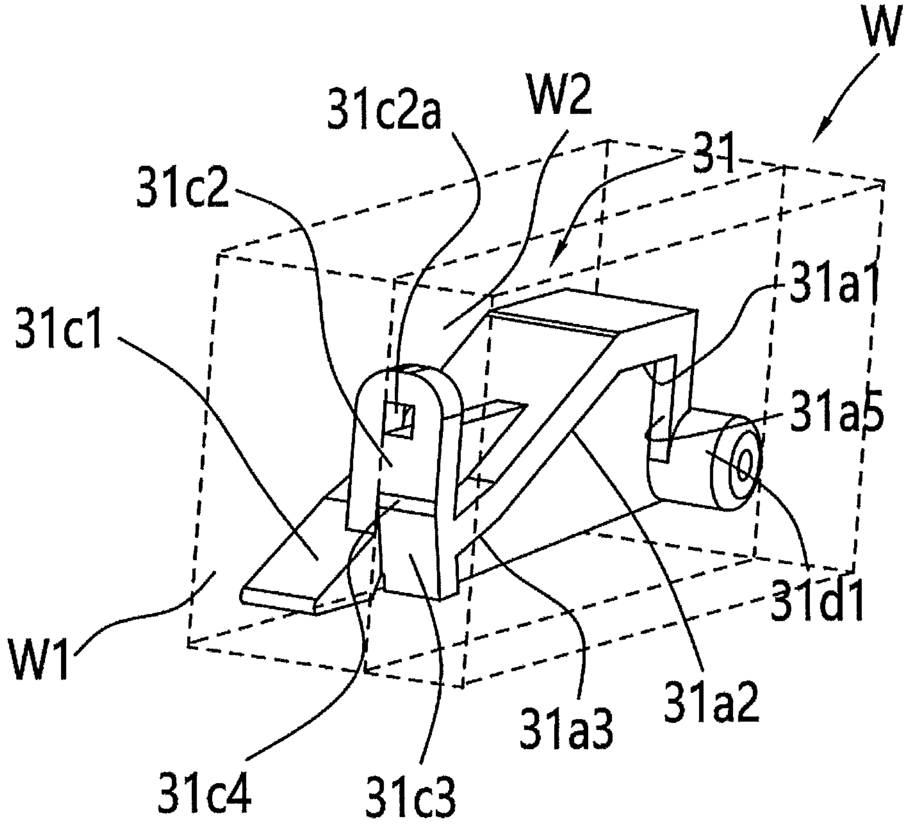
Figure 8C:
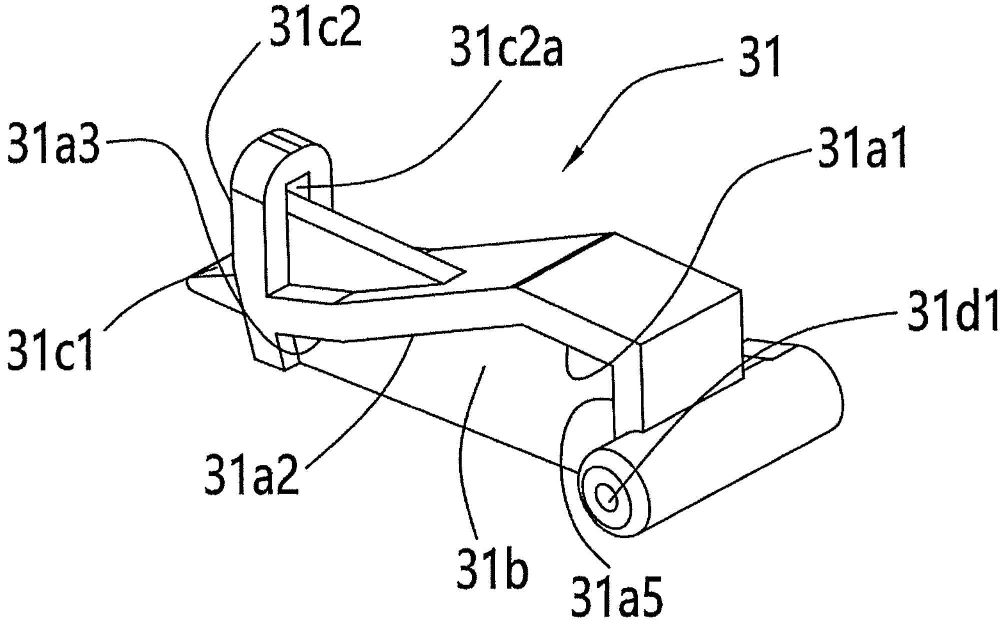
Figure 8D:
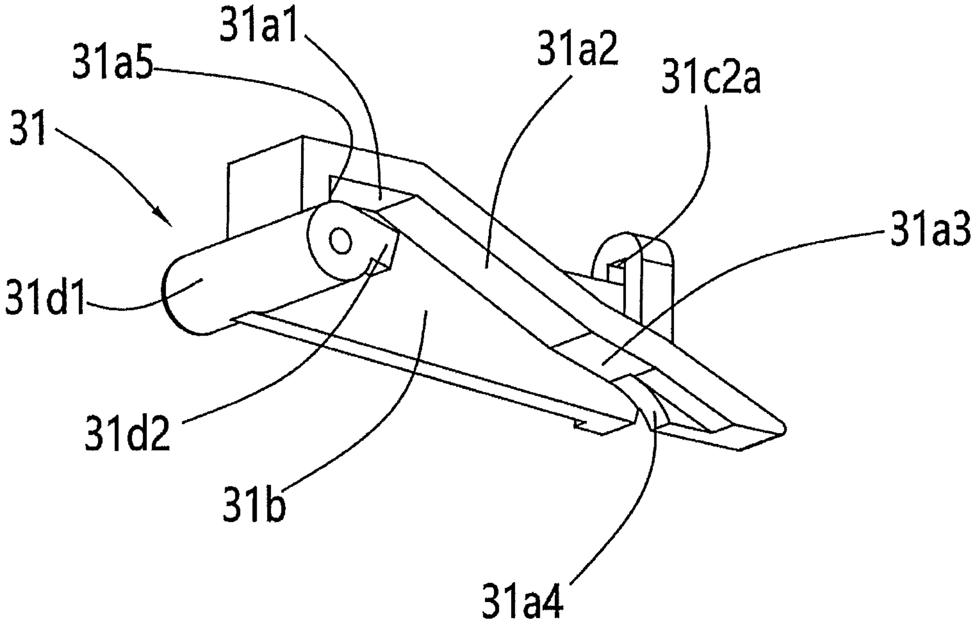

It should be noted that to further define that the above-mentioned lifting portion 31 can move along a predetermined position, as shown in FIGS. 7(*a*)-7(*c*), a guiding portion 3*a* extending from the second direction Y is provided in the photographic developer discharge portion 3. In the embodiment, the guiding portion 3*a* is generally circular and can contact the lifting portion 31, which causes the lifting portion 31 to transition from the first state to the third state or from the third state to the first state, and defines that the lifting portion 31 can move and rotate along a predetermined direction.

Figure 21A:
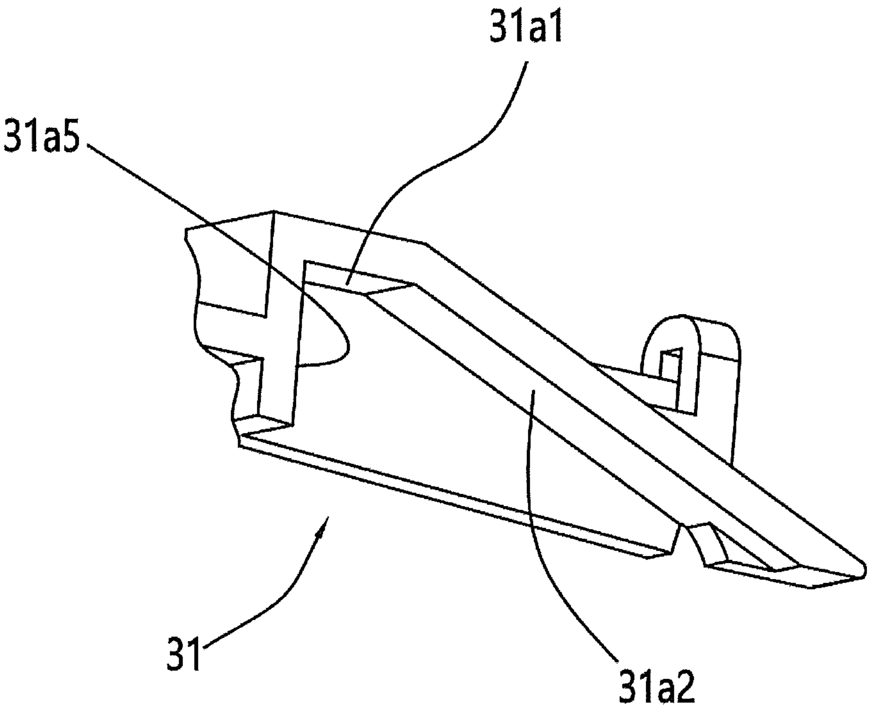
FIG. 21(*a*) is a schematic diagram of a first structure of a lifting portion according to some embodiments of the present disclosure.
Figure 21B:
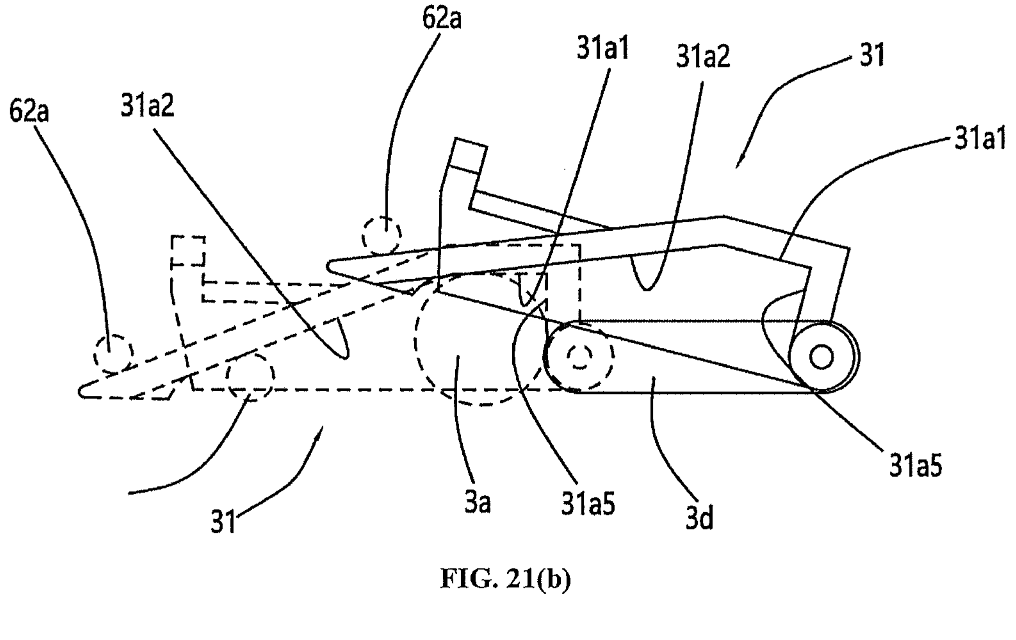

First, for some embodiments, namely the case where the first state directly switches to the third state, it is explained as follows. Specifically, the lifting portion 31 and the binding portion 62*a* always perform a curved displacement motion during the mounting and dismounting of the photographic developer container 10. As shown in FIG. 21(*a*), the contact portion between the lifting portion 31 and the guiding portion 3*a* is provided with a guide part 31*a*, wherein the guide part 31*a* includes a starting surface 31*a*1 and a guiding surface 31*a*2, with the starting surface 31*al* connected to the guiding surface 31*a*2.

On the side opposite the guiding surface 31*a*2 connected to the starting surface 31*al*, a contact surface 31*a*5 is provided. The contact surface 31*a*5 is generally parallel to the third direction Z in the first state, and the starting surface 31*al* is generally parallel to the first direction X in the first state. As shown in FIG. 21(*b*), when the guiding portion 3*a* contacts the starting surface 31*al*, the lifting portion 31 is in the first state. At this time, the portion of the surface of the guiding portion 3*a* facing the third direction X is in contact with the starting surface 31*al*. At the same time, the portion of the surface of the adjacent guiding portion 3*a* facing the first direction X and close to the main body of the photographic developer container 10 is in contact with the contact surface 31*a*5. That is to say, the side portion and the top portion of the guiding portion 3*a* are both in contact with the lifting portion 31 to restrict the position of the lifting portion 31 in the first state. When the photographic developer container 10 is pushed further towards the position of the image-forming apparatus, the guiding portion 3*a* is gradually transitioned by the snapping part from contacting the starting surface 31*al* and the contact surface 31*a*5 to contacting the guiding surface 31*a*2. At this time, the lifting portion 31 gradually moves from the first state to the third state along the first direction X, and rotates around the second rotation axis A2. At this point, the overall process of the lifting portion 31 transitioning directly from the first state to the third state during the cooperation of the lifting portion 31 and the guide part 31*a* is described. During the process from the first state to the third state, the receiving opening 11 and the hole 41 are on the same vertical line, but the binding portion 62*a* and the photographic developer blocking portion 4 are in a separated state. Only when the receiving opening 11, the hole 41, and the discharge opening 3*g* are on the same vertical line in the third state, the receiving opening 11 and the discharge opening 3*g* will be in a communicating state, thereby allowing the photographic developer to flow through the discharge opening 3*g*, the hole 41, and the receiving opening 11 into the image-forming apparatus.

Next, the case where the first state switches to the third state via the second state in other embodiments is explained. Specifically, during the mounting of the photographic developer container 10, the lifting portion 31 and the binding portion 62*a* first perform a curved displacement motion and then a linear displacement motion. Additionally, during the dismounting of the photographic developer container 10, they first perform a linear displacement motion and then a curved displacement motion. As shown in FIGS. 8(*a*)-8(*d*), a portion of the lifting portion 31 contacting the guiding portion 3*a* is provided with a guide part 31*a*, wherein the guide part 31*a* includes a starting surface 31*a*1, a guiding surface 31*a*2, and an ending surface 31*a*3. The starting surface 31*al* is connected to the guiding surface 31*a*2, and the guiding surface 31*a*2 is connected to the ending surface 31*a*3.

On the side opposite the guiding surface 31*a*2 connected to the starting surface 31*al*, a contact surface 31*a*5 is provided. The contact surface 31*a*5 is generally parallel to the third direction Z in the first state, and the starting surface 31*al* is generally parallel to the first direction X in the first state. When the guiding portion 3*a* is in contact with the starting surface 31*al*, the lifting portion 31 is in the first state. At this time, the portion of the surface of the guiding portion 3*a* facing the third direction X is in contact with the starting surface 31*al*. At the same time, the portion of the surface of the adjacent guiding portion 3*a* facing the first direction X and close to the main body of the photographic developer container 10 is in contact with the contact surface 31*a*5. That is to say, the side portion and the top portion of the guiding portion 3*a* are both in contact with the lifting portion 31 to restrict the position of the lifting portion 31 in the first state. When the photographic developer container 10 is pushed further towards the position of the image-forming apparatus, the guiding portion 3*a* is gradually transitioned by the snapping part from contacting the starting surface 31*al* and the contact surface 31*a*5 to contacting the guiding surface 31*a*2. At this time, the lifting portion 31 gradually moves from the first state to the second state along the first direction X, and rotates around the second rotation axis A2. When the photographic developer container 10 is pushed to the appropriate position in the image-forming apparatus, the guiding portion 3*a* gradually transitions from contacting the guiding surface 31*a*2 to contacting the ending surface 31*a*3. At this point, the lifting portion 31 is in the second state. When the guiding portion 3*a* moves from the starting point to the endpoint of the ending surface 31*a*3, the lifting portion 31 will only move in the first direction X, and will not rotate around the second rotation axis A2. At this moment, the lifting portion 31 is in the third state. At this point, the overall process of the lifting portion 31 transitioning from the first state to the third state during the cooperation of the lifting portion 31 and the guide part 31*a* is described. During the process from the first state to the second state, the receiving opening 11 and the hole 41*a* first are located on the same vertical line. In the second state, the binding portion 62*a* is in close contact with the photographic developer blocking portion 4. At this time, the receiving opening 11 and discharge opening 3*g* are still in an isolated and closed state. During the transition from the second state to the third state, the binding portion 62*a* and the photographic developer blocking portion 4 move together in the first direction X until the receiving opening 11, the hole 41*a*, and the discharge opening 3*g* are on the same vertical line. At this moment, the receiving opening 11 and the discharge opening 3*g* are in a communicating state. The photographic developer near the discharge opening 3*g* will not leak into the image-forming apparatus, thus ensuring that the photographic developer smoothly enters the receiving opening 11.

It should be noted that during the second state, the transition from the second state to the third state, or in the third state, the ending surface 31*a*3 always remains parallel to the displacement portion 3*d*. That is to say, in the above states, the lifting portion 31 always moves in a direction parallel to the first direction X.

Additionally, to prevent the lifting portion 31 from completely detaching from the guiding portion 3*a* in the third state, which would cause the subsequent movement of the lifting portion 31 to be outside the predetermined range, as shown in FIG. 8(*d*), a restriction surface 31*a*4 is provided on the opposite side of the ending surface 31*a*3 connected to the guiding surface 31*a*2. The restricting surface 31*a*4 is provided with a structure that is approximately arc-shaped. When the lifting portion 31 transitions into the third state, the guiding portion 3*a* is in contact with the ending surface 31*a*3 until it abuts the restriction surface 31*a*4. Due to the approximately arc-shaped structure of the restriction surface 31*a*4, it can further limit the movement of the lifting portion 31 when paired with the approximately circular structure of the guiding portion 3*a*.

Next, to better understand how the first state, the second state, and the third state of the lifting portion 31 respectively cause the photographic developer receiving portion 6 to move, as shown in FIGS. 7(*a*)-7(*c*), the lifting portion 31 in conjunction with the photographic developer receiving portion 6 is described in detail. The photographic developer receiving portion 6 includes a receiving opening 11 for receiving the photographic developer, a binding portion 62*a* that can be displaced integrally with the photographic developer receiving portion 6, and an abutting portion 62 that supports the binding portion 62*a*. Firstly, the receiving opening 11 penetrates through the photographic developer receiving portion main body 61 in the third direction Z from top to bottom. The abutting portion 62 extends upward from the upper end of the photographic developer receiving portion main body 61 in the third direction Z, and the binding portion 62*a* is arranged on the abutting portion 62 extending towards the photographic developer discharge portion 3 in the second direction Y. Additionally, in some embodiments, as shown in FIG. 8(*a*)-8(*d*), the lifting portion 31 further includes an engaging portion 31*c*, wherein the engaging portion 31*c* includes a first engaging surface 31*c*1 configured for abutting the binding portion 62*a* during the mounting and dismounting operations of the photographic developer container 10 to ensure that the binding portion 62*a* does not detach from the first engaging surface 31*c*1 during the mounting and dismounting operations; and a second sub-engaging surface 31*c*2 configured for abutting the abutting portion 62 when the lifting portion 31 is in the first state, the second state, and the third state.

In the embodiment, the second sub-engaging surface 31*c*2 is provided with two surfaces, one of which is the second sub-engaging surface 31*c*2 configured for abutting the abutting portion 62 when the lifting portion 31 is in the first state, and another of which is the second sub-engaging surface 31*c*3 configured for abutting the abutting portion 62 when the lifting portion 31 is in the second state and the third state.

Specifically, as shown in FIG. 8(*b*), the second sub-engaging surface 31*c*2 forms a surface W in the second direction Y, wherein the surface W is provided with adjacent first engaging surface 31*c*1, second sub-engaging surface 31*c*2, and second sub-engaging surface 31*c*3. That is, the first engaging surface 31*c*1 is adjacent to the second sub-engaging surface 31*c*2 and the second sub-engaging surface 31*c*3 on the surface W. The second sub-engaging surface 31*c*2 is adjacent to the first engaging surface 31*c*1 and the second sub-engaging surface 31$c$3 on the surface W. The second sub-engaging surface 31$c$3 is adjacent to the first engaging surface 31$c$1 and the second sub-engaging surface 31$c$2 on the surface W. The surface W in contact with the binding portion 62$a$ is divided into a first surface W1, and the surface W in contact with the abutting portion 62 (abutting surface 62$b$) is divided into a second surface W2. The first engaging surface 31$c$1 is located on the first surface W1, and the second sub-engaging surface 31$c$2 and the second sub-engaging surface 31$c$3 are located on the second surface W2. It can prevent the binding portion 62$a$ and the abutting portion 62 from contacting surfaces that should not be in contact, which could cause the lifting portion 31 to move along an unintended path, leading to movement or rotation stalling of the lifting portion 31.

It should be noted that the second sub-engaging surface 31$c$2 and the second sub-engaging surface 31$c$3 are provided with adjacent surfaces at the junction in the third direction Z, wherein the section of the adjacent surface is roughly arc-shaped, to prevent stalling of the abutting surface 62$b$ during the transition from the first state in contact with the first engaging surface 31$c$1 to the second state in contact with the second sub-engaging surface 31$c$2, thus ensuring the smoothness of the state switch.

Figure 22:
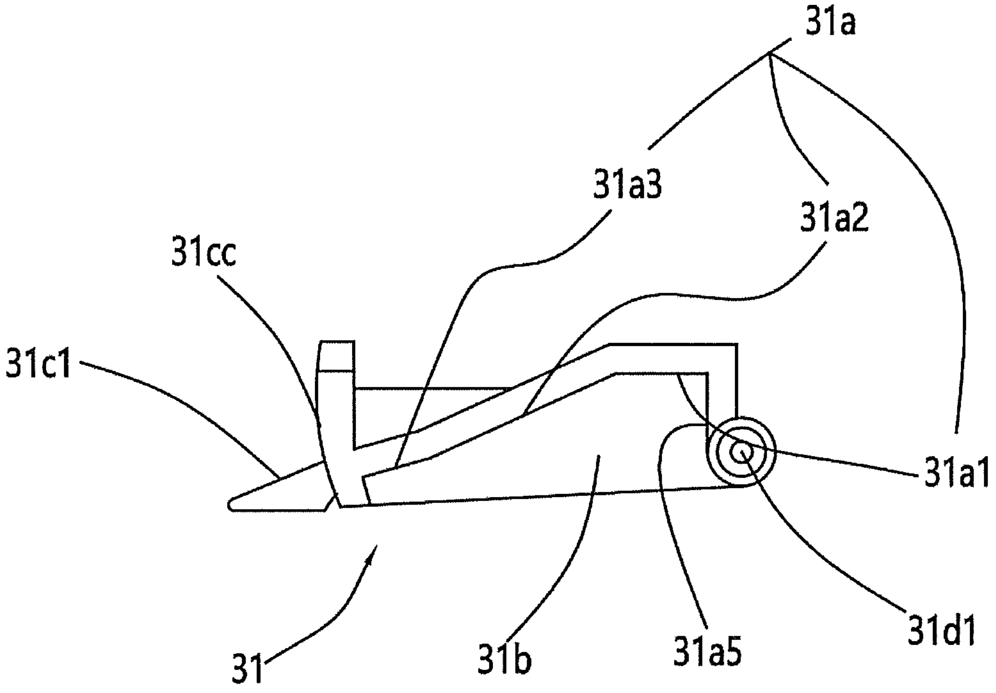
FIG. 22 is a schematic structural diagram of a lifting portion according to some other embodiments of the present disclosure.

In other embodiments, as shown in FIG. 22, the second engaging surface 31$cc$ can be an arc surface. The arc surface structure of the second engaging surface 31$cc$ can follow the abutting surface 62$b$ so that the binding portion can smoothly abut the lifting portion during the transition of the lifting portion from the first state to the third state to maintain smooth conversion.

Specifically, as shown in FIG. 7($a$)-7($c$), a first vertical line of the photographic developer receiving portion 6 is Q1 in the second direction Y, and a second vertical line of the discharge opening 3$g$ of the photographic developer discharge portion 3 is Q2 in the second direction Y.

In the first state, the photographic developer container 10 moves towards the image-forming apparatus in the first direction X, and the binding portion 62$a$ on the abutting portion 62 first reaches and contacts the first engaging surface 31$c$1 located at the engaging portion 31$c$, where the first engaging surface 31$c$1 acts as the rotating end of the lifting portion 31 so as to rotate to drive the displacement of the binding portion 62$a$. As the photographic developer container 10 continues to move towards the image-forming apparatus in the first direction X, the abutting surface 62$b$ of the abutting portion 62 near the photographic developer container body 1 will abut against the second sub-engaging surface 31$c$2. At this point, the first vertical line Q1 of the photographic developer receiving portion 6 (i.e., the first vertical line Q1 of the receiving opening 11) is far from the second vertical line Q2 of the discharge opening 3$g$, and the lifting portion 31 is in the first state.

In the second state, the photographic developer container 10 moves further towards the image-forming apparatus in the first direction X. The lifting portion 31, due to the cooperation of its guiding surface 31$a$2 with the guiding portion 3$a$, causes the abutting surface 62$b$ to gradually separate from the second sub-engaging surface 31$c$2 and abut against the second sub-engaging surface 31$c$3. The lifting portion 31 moves in the first direction X and rotates clockwise around the second rotation axis A2. At this point, the photographic developer receiving portion 6 will also move in an arc segment that is roughly upward with the center of a circle facing downward due to the cooperation between its binding portion 62$a$ and the first engaging surface 31$c$1. Similarly, the binding portion 62$a$ will follow the same trajectory as the above photographic developer receiving portion 6. At this point, the first vertical line Q1 of the photographic developer receiving portion 6 (i.e., the first vertical line Q1 of the receiving opening 11) is closer to the second vertical line Q2 of the discharge opening 3$g$, and the lifting portion 31 is in the second state.

In the third state, the photographic developer container 10 moves further towards the image-forming apparatus in the first direction X. The guiding portion 3$a$ moves from the start point in contact with the ending surface 31$a$3 of the lifting portion 31 to the end point. At this point, the abutting surface 62$b$ will continuously abut against the second sub-engaging surface 31$c$3. The lifting portion 31 will only move in the first direction X without rotation. The photographic developer receiving portion 6 will also move horizontally in the first direction X due to the cooperation of its binding portion 62$a$ with the first engaging surface 31$c$1. Similarly, the binding portion 62$a$ will follow the same trajectory as the above photographic developer receiving portion 6. At this point, the first vertical line Q1 of the photographic developer receiving portion 6 (i.e., the first vertical line Q1 of the receiving opening 11) overlaps with the second vertical line Q2 of the discharge opening 3$g$, and the lifting portion 31 is in the third state.

It should be noted that the binding portion 62$a$ remains stationary relative to the first engaging surface 31$c$1 in the first direction X. Only during the above transition from the first state to the second state will the binding portion 62$a$ rotate relative to the first engaging surface 31$c$1 and be in close contact with the first engaging surface 31$c$1, without moving relative to the first engaging surface 31$c$1 in the first direction X. In other cases, the binding portion 62$a$ remains stationary. Since the binding portion 62$a$ only presents in a rotate state relative to the lifting portion 31 during the displacement process, the binding portion 62$a$ does not move a long distance relative to the lifting portion 31, thus reducing the possibility of surface wear or even breakage due to frequent friction between the binding portion 62$a$ and the lifting portion 31.

It should be noted that, to ensure the strength of the first engaging surface 31$c$1 and prevent the first engaging surface 31$c$1 from breaking due to supporting the photographic developer receiving portion 6, the first engaging surface 31$c$1 is arranged in a generally triangular structure. That is, when the lifting portion 31 is mounted to the photographic developer discharging portion 3, the first engaging surface 31$c$1 on the lifting portion 31 forms a certain angle with the displacement portion 3$d$ to ensure that the portion bearing the first engaging surface 31$c$1 is structurally reinforced.

Figure 9A:
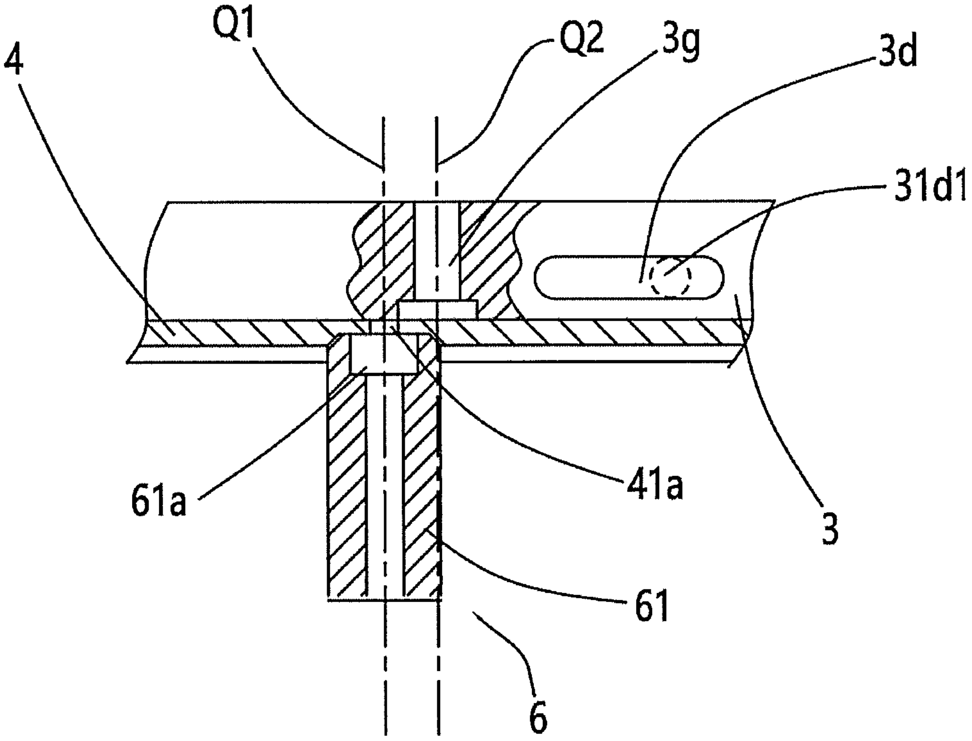
FIG. 9(*a*) is a schematic structural diagram of a discharge opening, a hole, and a receiving opening cooperated in a first state of the photographic developer container according to the present disclosure.
Figure 9B:
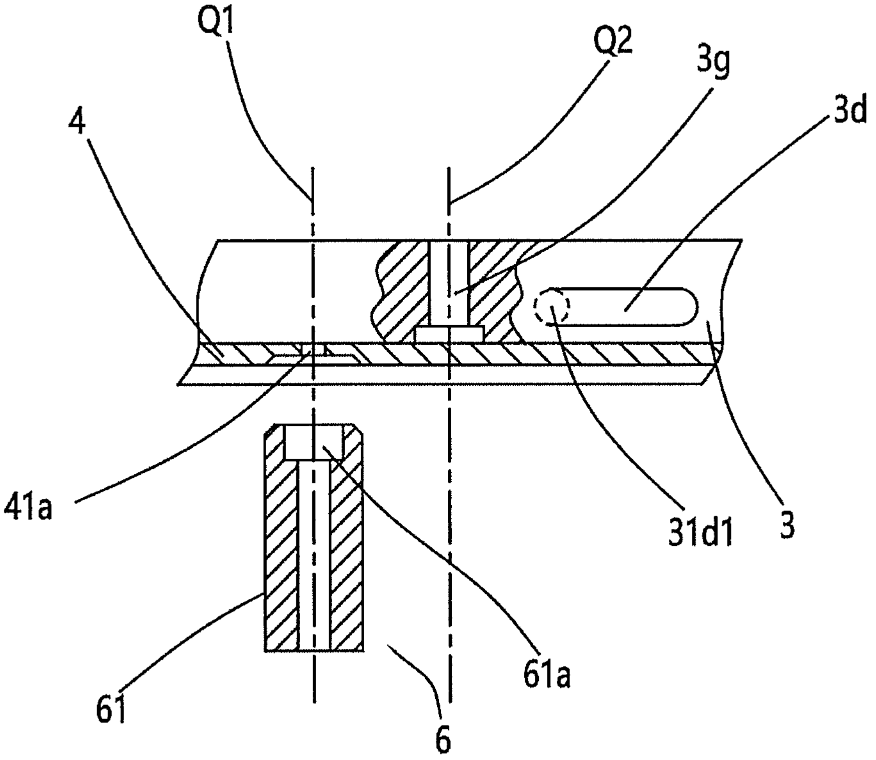
Figure 9C:
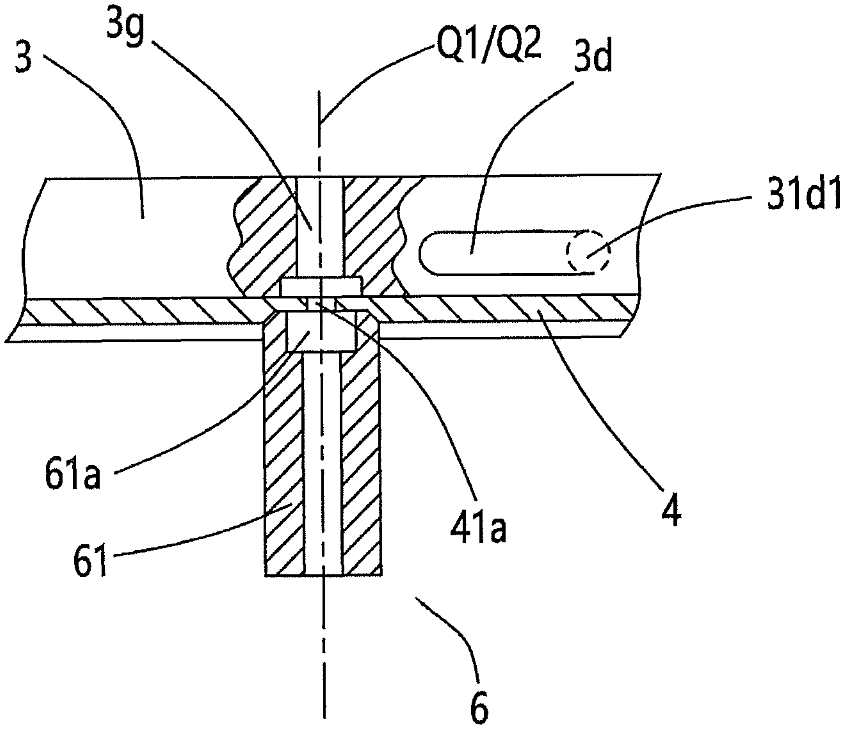

To better understand the case of the fluid communication or closure between the discharge opening 3$g$ and the receiving opening 11 caused by the cooperative movement of the lifting portion 31 and the photographic developer receiving portion 6, as shown in FIG. 9($a$)-9($c$), in the embodiment, a photographic developer blocking portion 4 is further included, wherein the photographic developer blocking portion 4 can move relative to the above photographic developer discharging portion 3 at the bottom (below in the third direction Z) of the photographic developer discharging portion 3. The photographic developer blocking portion 4 includes a hole 41$a$ that can communicate with the discharge opening 3$g$ and the receiving opening 11, and can open and close the discharge opening 3$g$ according to the mounting and dismounting operations of the photographic developer container 10. That is to say, through the mounting and dismounting operations of the photographic developer container 10, the photographic developer blocking portion 4 can move relative to the photographic developer container 10. During the mounting operation, the receiving opening 11 of the photographic developer receiving portion 6 communicates with the hole 41*a* of the photographic developer blocking portion 4, and also communicates with the discharge opening 3*g* of the photographic developer discharging portion 3. This means that the first vertical line Q1 of the photographic developer receiving portion 6 (i.e., the first vertical line Q1 of the receiving opening 11) overlaps with the second vertical line Q2 of the discharge opening 3*g*. Accordingly, the photographic developer in the photographic developer container body 1 can be sequentially discharged through the discharge opening 3*g* and the hole 41*a* to the receiving opening 11 of the photographic developer receiving portion 6.

Figure 11A:
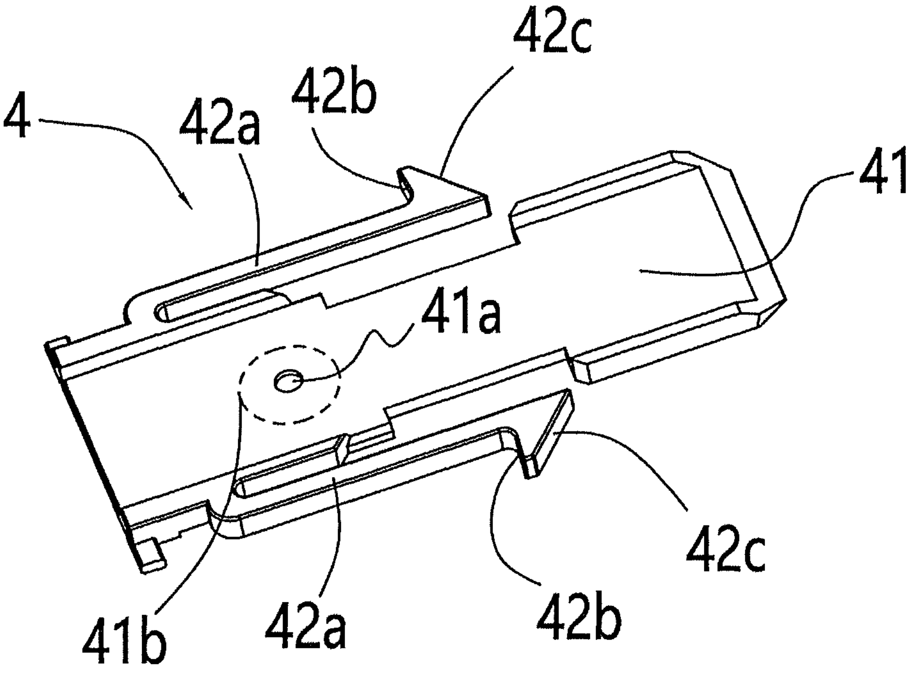
FIG. 11(*a*) is a schematic diagram of a first structure of a photographic developer blocking portion of a photographic developer container according to the present disclosure.
Figure 11B:
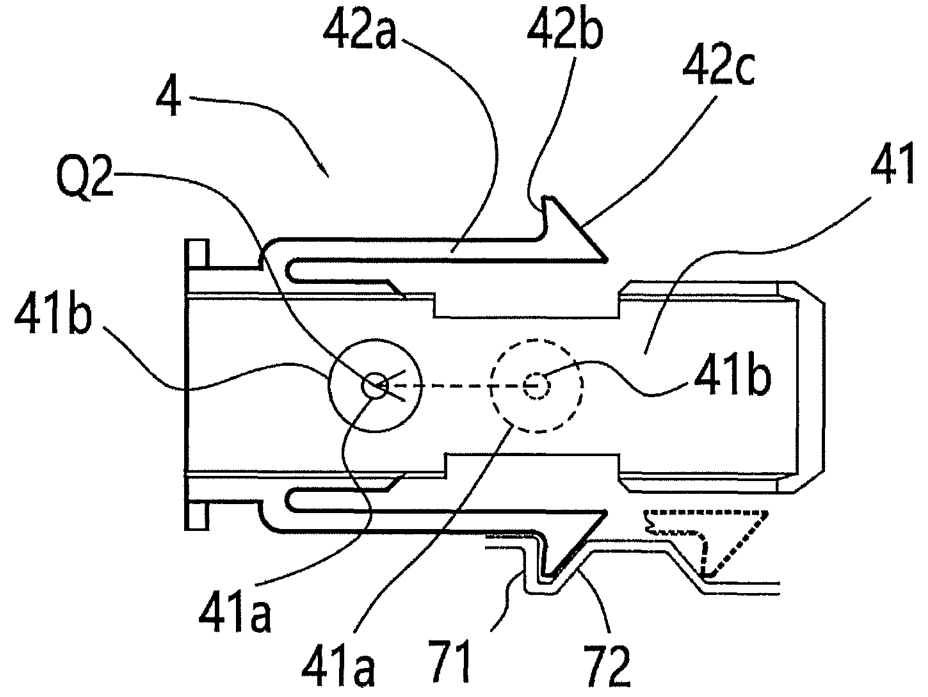
Figure 12A:
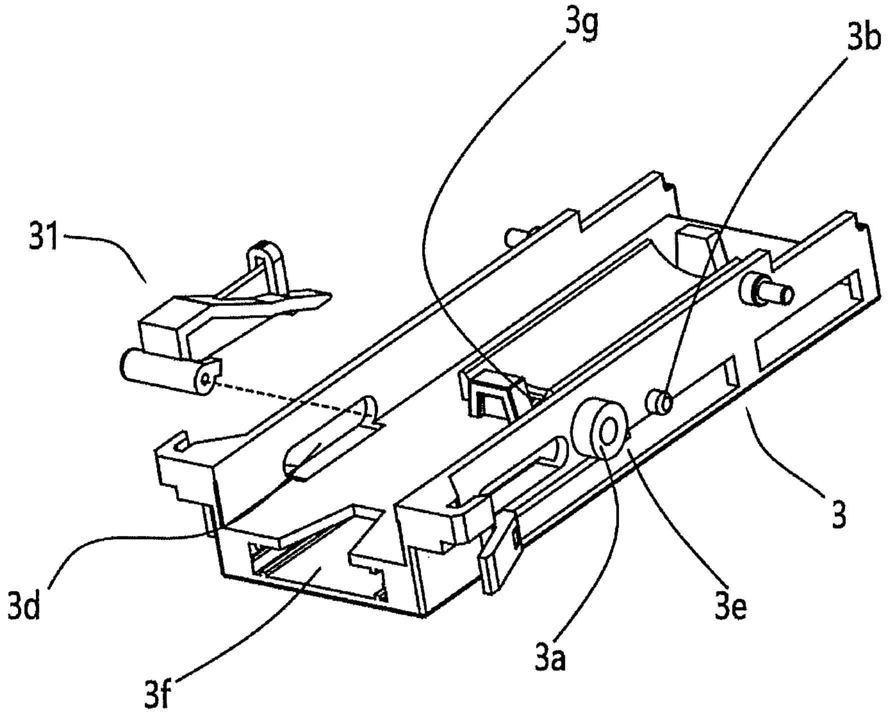
FIG. 12(*a*) is a schematic diagram of a first structure of a lifting portion of a photographic developer container being mounted to the photographic developer discharge portion according to some embodiments of the present disclosure.
Figure 12B:
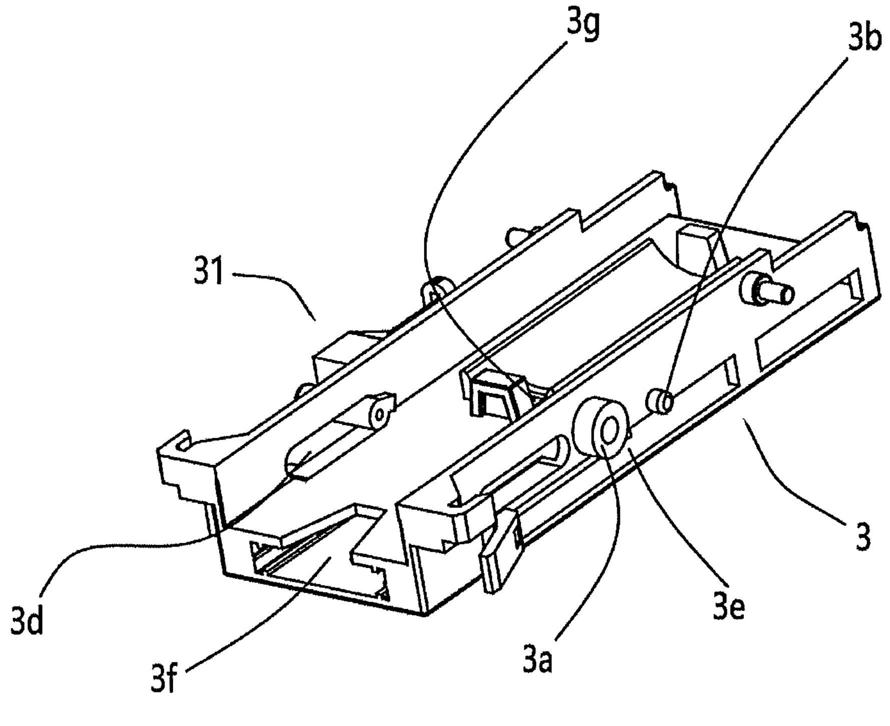
Figure 12C:
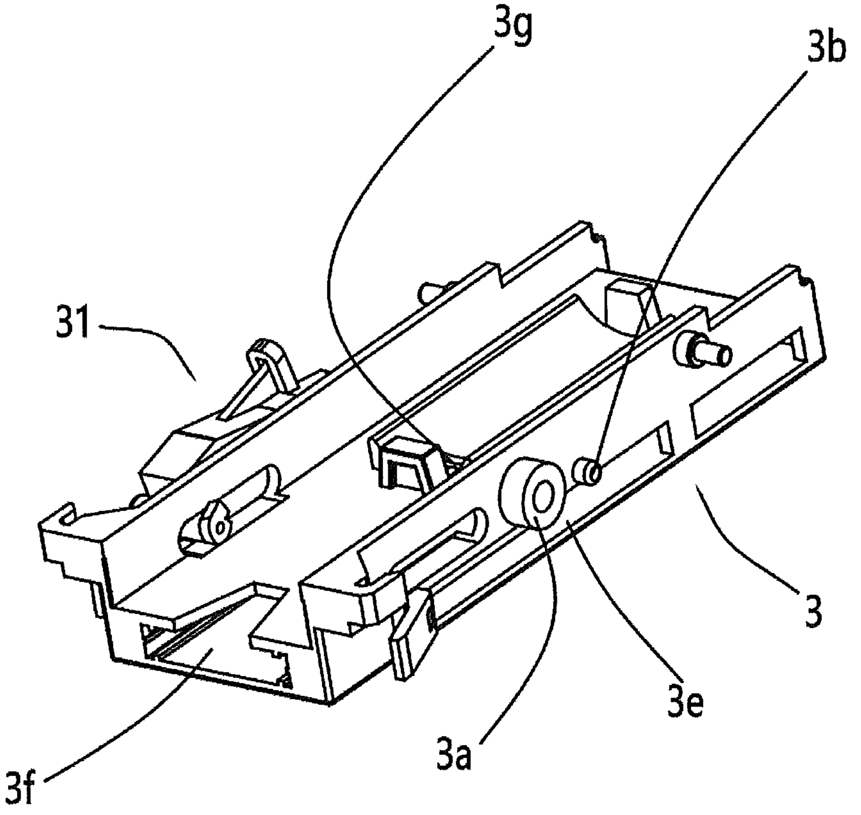
Figure 13A:
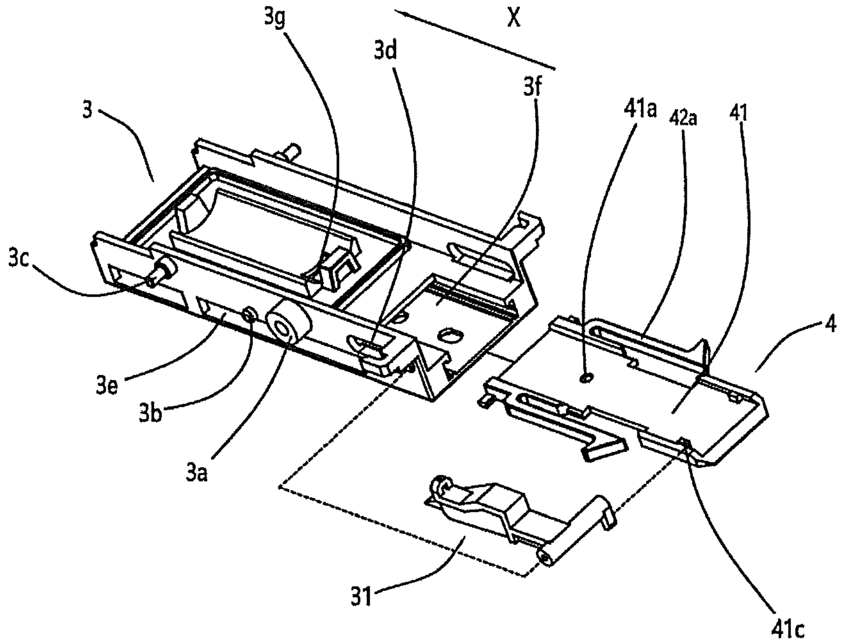
FIG. 13(*a*) is a schematic diagram of a first structure of a lifting portion of a photographic developer container being mounted to the photographic developer discharge portion according to some other embodiments of the present disclosure.
Figure 13B:
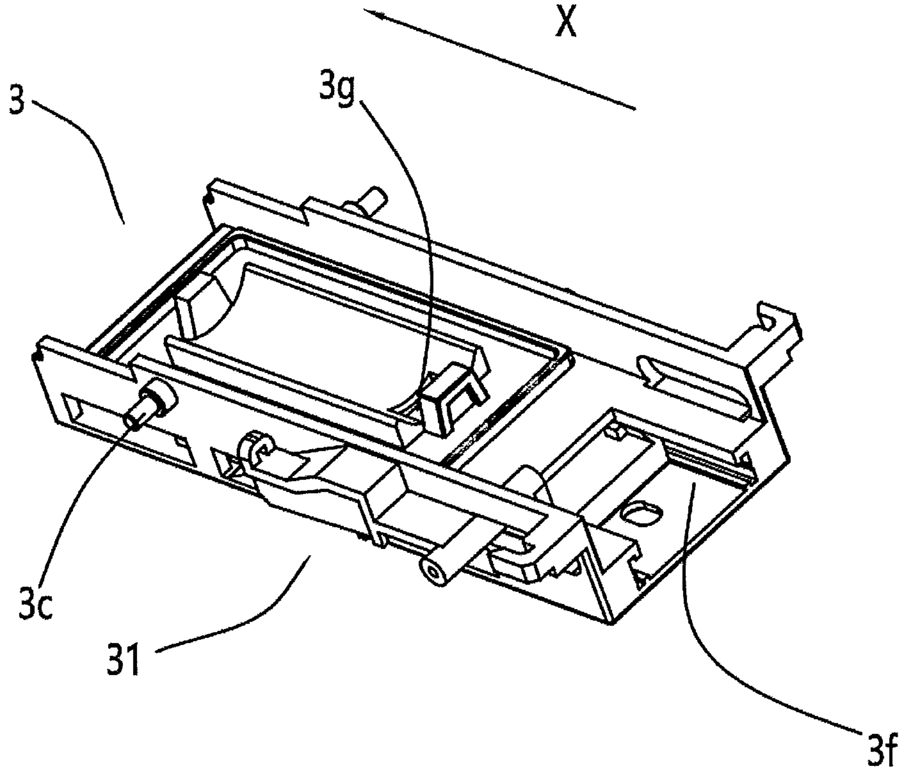
Figure 13C:
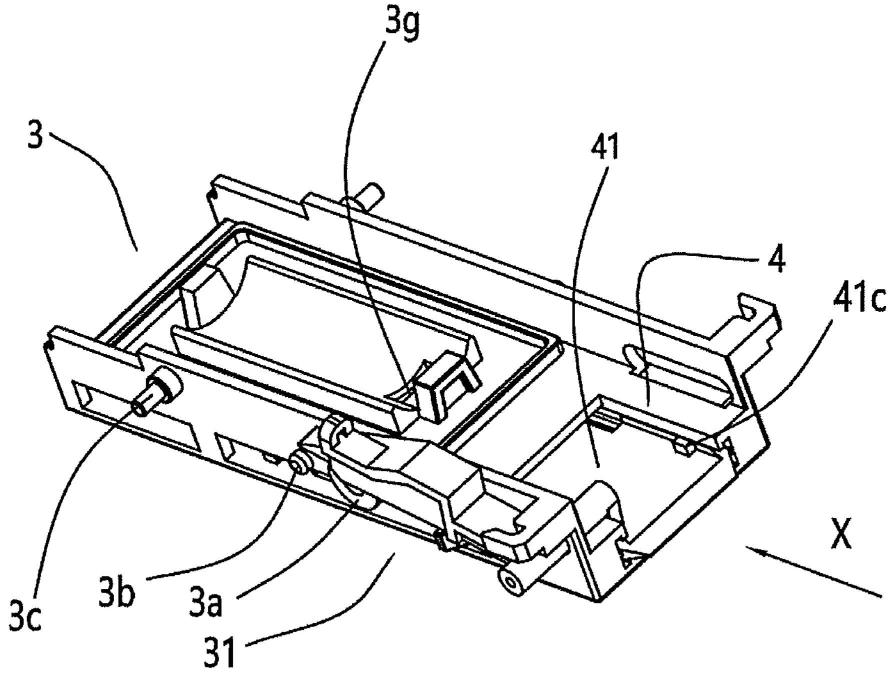

Additionally, as shown in FIGS. 11(*a*) and 11(*b*), a face of the photographic developer blocking portion 4 facing downward along the third direction Z is provided with a connecting surface 41*b* around the hole 41*a*, wherein the connecting surface 41*b* can be connected to the upper surface of the photographic developer receiving portion main body 61 parallel to the third direction Z when the photographic developer blocking portion 4 is in contact with the photographic developer receiving portion 6. The diameter of the connecting surface 41*b* is larger than the diameter of the hole 41*a* and is parallel to the hole 41*a* relative to the first direction X in the photographic developer blocking portion 4, which can prevent leakage of the photographic developer when it flows from the hole 41*a* to the receiving opening 11.

As shown in FIGS. 10(*a*), 11(*a*), and 11(*b*), the photographic developer blocking portion 4 is provided with a blocking part 41, wherein the blocking part 41 can block the photographic developer from discharging from the discharge opening 3*g* to the receiving opening 11 in the first state and the second state. Additionally, as shown in FIGS. 11(*a*) and 11(*b*), the photographic developer blocking portion 4 is also provided with a first stopped part 42*b* and a second stopped part 42*c*. The first stopped part 42*b* and the second stopped part 42*c* are arranged at the free ends of the support part of the photographic developer blocking portion 4 extending in the first direction X. The first stopped part 42*b* and the second stopped part 42*c* can engage with the first stopping part 71 and the second stopping part 72 inside the image-forming apparatus. When the first stopped part 42*b* engages with the first stopping part 71, the position of the photographic developer blocking portion 4 relative to the image-forming apparatus is fixed, i.e., the case where the first vertical line Q1 of the receiving opening 11 overlaps with the second vertical line Q2 of the discharge opening 3*g*. When the second stopped part 42*c* and the second stopping part 72 engage to each other, the first stopped part 42*b* can be released from the first stopping part 71 when removing the photographic developer container 10. Accordingly, the photographic developer blocking portion 4 can be moved relative to the position of the image-forming apparatus, that is, the first vertical line Q1 of the receiving opening 11 is closer to or farther from the second vertical line Q2 of the discharge opening 3*g*.

It should be noted that in the first state, the second state, and the third state, the central axis of the receiving opening 11 of the above photographic developer receiving portion 6 always overlaps with the central axis of the hole 41*a* of the photographic developer blocking portion 4, that is, the first vertical line Q1 of the receiving opening 11 equals the first vertical line Q1 of the hole 41*a*.

To understand more intuitively how the path of the lifting portion 31 moving in the first direction X and rotating clockwise around the second rotation axis A2 drives the binding portion 62*a* and the photographic developer receiving portion 6 containing the binding portion 62*a*, as shown in FIG. 10(*a*)-10(*c*), the photographic developer discharging portion 3 is provided with a displacement portion 3*d* extending along a line parallel to the first direction X of the photographic developer container 10. The lifting portion 31 is provided with a driving portion 31*d*1 configured to cooperate with the displacement portion 3*d*. The driving portion 31*d*1, as the moving end of the lifting portion 31, extends in the second direction Y towards the photographic developer discharging portion 3 and is snapped into the displacement portion 3*d*.

As shown in FIG. 10(*a*), during the transition of the lifting portion 31 from the first state to the second state, due to the above described cooperation between the guiding portion 3*a* and the guiding surface 31*a*2, and the cooperation between the displacement portion 3*d* and the driving portion 31*d*1, the lifting portion 31 moves a distance of a first section P1 in the first direction X according to the driving portion 31*d*1 moving along the displacement portion 3*d*. The offset angle of the binding portion 62*a* rotating clockwise about itself along the second rotation axis A2 relative to the photographic developer discharging portion 3 is the first angle S1. The actual path from the binding portion in the first state 62*a* to the binding portion in the second state 62*a*' is the stroke A. Specifically, the first section P1 is the distance from the second rotation axis A2 of the driving portion in the first state 31*d*1 to the second rotation axis A2 of the driving portion in the second state 31*d*1'. The first angle S1 is the angle formed by the line drawn from the center of the binding portion in the first state 62*a* to the center of the driving portion 31*d*1 and the line drawn from the center of the binding portion in the second state 62*a*' to the center of the driving portion 31*d*1'.

As shown in FIG. 10(*b*), during the transition of the lifting portion 31 from the second state to the third state, due to the cooperation between the guiding portion 3*a* and the ending surface 31*a*3 and the restriction surface 31*a*4, and the cooperation between the displacement portion 3*d* and the driving portion 31*d*1 in the above description, the lifting portion 31 moves a distance of a second section P2 in the first direction X according to the driving portion 31*d*1 along the displacement portion 3*d*, and the actual path from the binding portion in the second state 62*a*' to the binding portion in the third state 62*a*" is the stroke B. At this time, since the ending surface 31*a*3 is parallel to the first direction X and the displacement portion 3*d*, the lifting portion 31 will only move integrally along the displacement portion 3*d* in the first direction X and will not rotate. Specifically, the second section P2 is the distance from the second rotation axis A2 of the driving portion in the second state 31*d*1' to the second rotation axis A2 of the driving portion in the third state 31*d*1". The second angle S2 is the angle formed by the line drawn from the center of the binding portion 62*a* in the first state to the center of the driving portion 31*d*1 and the line drawn from the center of the binding portion 62*a*" in the third state to the center of the driving portion 31*d*1".

According to the above, as shown in FIG. 10(*c*), the moving and rotating paths of the aforementioned binding portion 62*a* and the driving portion in the first state 31*d*1, the second state, and the third state can be included.

It can be understood that the first angle S1 is equal to the second angle S2, the first section P1 is much larger than the second section P2, and the stroke A is much larger than the stroke B.

Specifically, the binding portion in the first state 62*a* moves from the first vertical axis Q1 in the first direction X to the first vertical axis Q1' of the binding portion in the second state 62*a*'; then, it moves in the first direction X from the first vertical axis Q1' of the binding portion in the second state 62*a*' to the first vertical axis Q1" of the binding portion in the third state 62*a*".

Additionally, the driving portion in the first state 31*d*1 moves in the first direction X to the driving portion in the second state 31*d*1', and the driving portion in the second state 31*d*1' moves in the first direction X to the driving portion in the third state 31*d*1". From the above, it can be known that the binding portion 62*a* and the driving portion 31*d*1 move along the path in the first direction X in the first state, the second state, and the third state. In fact, due to the cooperation of the lifting portion 4 and the guiding portion 31 described above, the binding portion 62*a* moves along the first direction X, at the same time, it will also ascend a certain height along a curve formed in the third direction Z, so that the receiving opening 61*a* communicates with the hole 41*a*.

That is to say, in the case of the transition from the first state to the second state, the displacement and rotation amplitude of the lifting portion is large. Moreover, in the case of the transition from the second state to the third state, the displacement amplitude of the lifting portion is small, and no rotation occurs. It should be noted that during the mounting of the photographic developer container 10, when the lifting portion 31 transitions from the first state to the second state, in order to ensure that the receiving opening 11 of the photographic developer receiving portion 6 and the hole 41*a* of the photographic developer blocking portion 4 can quickly transition from a separated state to a contact state, the displacement and rotation of the lifting portion 31 can enable the photographic developer receiving portion 6 on the binding portion 62*a* to quickly move to the contact position with the photographic developer blocking portion 4, thereby achieve rapid positioning. Furthermore, after the photographic developer receiving portion main body 61 is in contact with the photographic developer blocking portion 4 so that the receiving opening 11 communicates with the hole 41*a*, the relative displacement amplitude of the photographic developer receiving portion 6, the stopper, and the photographic developer discharge portion 3 is reduced. Therefore, the distance of the second section P2 of the movement of the driving portion 31*d*1 will be smaller than the first section P1, to prevent the photographic developer from leaking prematurely from the discharge opening 3*g*, causing waste and accumulation of the photographic developer.

To better understand how the photographic developer blocking portion 4 is mounted to the photographic developer discharge portion 3, as shown in FIGS. 10(*a*) and 10(*b*), the bottom of the photographic developer discharge portion 3 along the first direction X is provided with a cavity 3*f*. Two sets of stopper holes 3*e* are symmetrically arranged in the direction of the side portion of the cavity 3*f*, i.e., in the second direction Y. When mounting the photographic developer blocking portion 4, first, the end away from the blocking part 41, the first stopped part 42*b*, and the second stopped part 42*c* is inserted into the cavity 3*f*. Simultaneously, the support part made of plastic deforms to drive the first stopped part 42*b* and the second stopped part 42*c* to be placed inside the cavity 3*f*. Sequentially, the photographic developer blocking portion 4 is moved into the cavity 3*f* until the first stopped part 42*b* and the second stopped part 42*c* are snapped into the stopper holes 3*e* due to the recovery of the support part to its original state. The first stopped part 42*b* and the second stopped part 42*c* can respectively stop on both side portions of the stopper hole 3*e*, which uses the stopper hole 3*e* to limit the moving position of the photographic developer blocking portion 4 in the first direction X.

To further restrict the movement range of the lifting portion 31, as shown in FIG. 8(*d*), 12(*a*)-12(*c*), a limiting part 31*d*2 is arranged on the end of the driving portion 31*d*1, passing through the displacement portion 3*d* and close to the photographic developer discharge portion. The limiting part 31*d*2 fits with the side wall 31*b* of the photographic developer discharge portion 3 and extends in the direction away from the displacement portion 3*d*. When the lifting portion 31 moves and rotates along the displacement portion 3*d*, the driving portion 31*d*1 can always be confined to keep moving in the position of the displacement portion 3*d*, thus ensuring the overall movement and rotation of the lifting portion 31.

Figure 14:
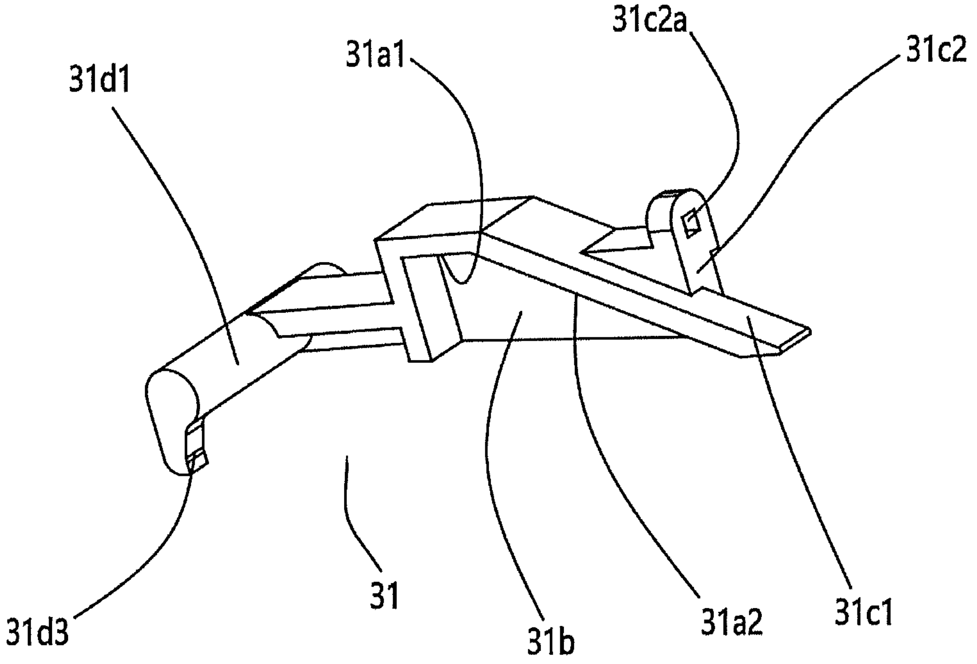
FIG. 14 is a schematic structural diagram of the lifting portion of the photographic developer container according to some other embodiments of the present disclosure.

In some other embodiments, as shown in FIG. 14, 13(*a*)-13(*c*), to prevent the photographic developer blocking portion 4 from stalling along with the second stopping part 72 during the dismounting of the photographic developer container 10, which would cause the photographic developer blocking portion 4 to fail to reset, or the lifting portion 31 to be unable to lift through the photographic developer receiving portion 6 during the mounting of the photographic developer container 10. In the embodiment, the photographic developer blocking portion 4 is connected to the lifting portion 31, so that the photographic developer blocking portion 4 drives the lifting portion 31 to move. This causes the photographic developer blocking portion 4 to move to ensure that the hole 41*a* and the receiving opening 11 are in a communicating state so that the discharge opening 3*g* and the hole 41*a* are communicated. Specifically, a pushing portion 31*d*3 is provided at the end of the driving portion 31*d*1, passing through the displacement portion 3*d* and close to the photographic developer discharge portion. A pushing member 41*c* is provided on the blocking part 41 of the photographic developer blocking portion 4, extending along the third direction Z near the first rotation axis A1. The lifting portion 31 achieves linkage with the photographic developer blocking portion 4 through the contact between the pushing portion 31*d*3 and the pushing member 41*c*. During the mounting of the photographic developer container 10, since the photographic developer blocking portion 4 will cooperate with the first stopping part 71 and the second stopping part 72 described above, it moves relative to the photographic developer discharge portion 3, thereby causing the pushing member 41*c* on the blocking part 41 to move and driving the pushing portion 31*d*3 that contacts the pushing member 41*c* to move. This drives the lifting portion 31 to move and rotate through the cooperation of the guiding portion 3*a* and the guiding surface 31*a*2, and the cooperation of the displacement portion 3*d* and the driving portion 31*d*1 described above. The photographic developer blocking portion 4 drives the lifting portion 31 to move and rotate. Even when the lifting portion 31 cannot fully cooperate with the photographic developer receiving portion 6, the lifting portion 31 and the photographic developer blocking portion 4 can both transition to the communicating state (the second and third states). Furthermore, during the dismounting of the photographic developer container 10, since the spring as the resetting portion 32 has the potential energy to restore to the initial state, it will move the lifting portion 31 towards a position close to the resetting portion 32. At this time, the pushing portion 31*d*3 of the lifting portion 31 will drive the blocking part 41 arranged with the pushing member 41*c* to move towards the position close to the resetting portion 32. When the second stopping part 72 cannot cooperate with the photographic developer blocking portion 4, the lifting portion 31 and the photographic developer blocking portion 4 can both be restored to the initial state (first state).

Figure 15A:
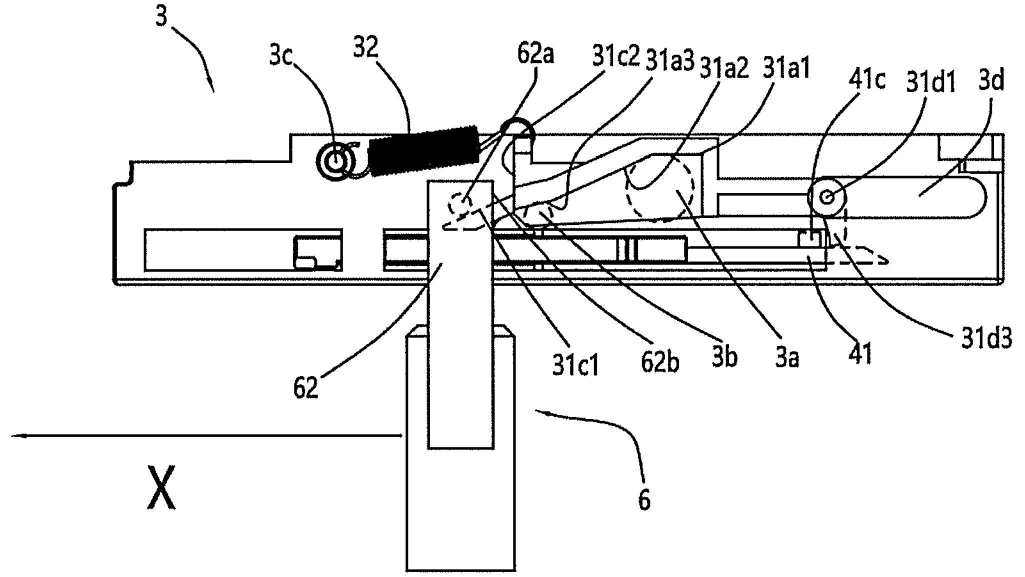
FIG. 15(*a*) is a schematic structural diagram of a lifting portion and a photographic developer receiving portion cooperated in a first state according to some other embodiments of the present disclosure.
Figure 15B:
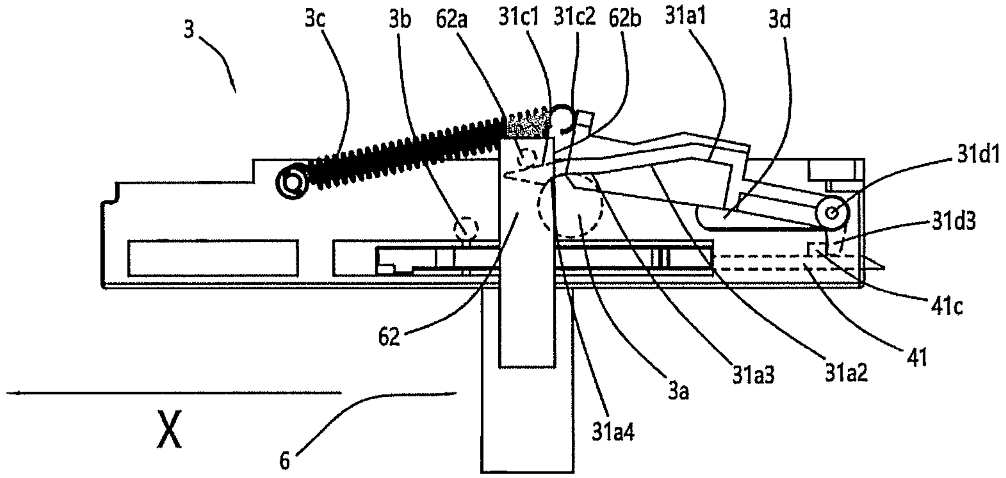

It should be noted that, as shown in FIG. 15(*a*), 15(*b*), in the embodiment, the engaging portion 31*c* of the lifting portion 31 is only provided with a first engaging surface 31*c*1. When the first engaging surface 31*c*1 is in contact with the binding portion 62*a* during the mounting of the photographic developer container 10, the photographic developer blocking portion 4 immediately begins the movement of driving the lifting portion 31 as described above. Furthermore, when the first engaging surface 31*c*1 separates from the binding portion 62*a* during the dismounting of the photographic developer container 10, the movement of driving the lifting portion 31 as described above by the photographic developer blocking portion 4 immediately ends. From this, it can be understood that whether the lifting portion 31 moves and rotates with the photographic developer blocking portion 4 can be judged by whether the binding portion 62*a* contacts the first engaging surface 31*c*1.

Figure 17:
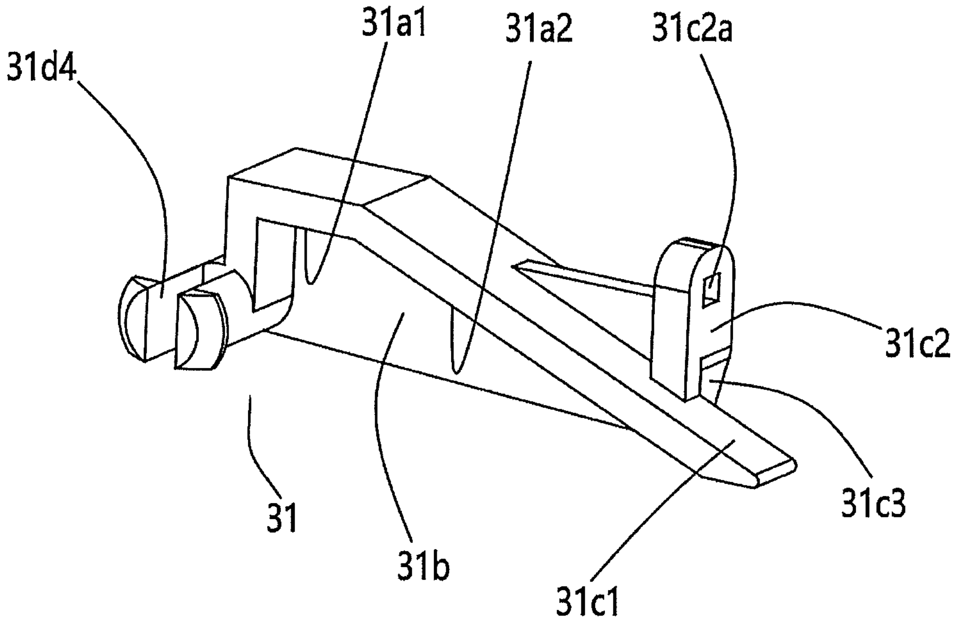
FIG. 17 is a schematic structural diagram of a lifting portion of a photographic developer container according to some other embodiments of the present disclosure.
Figure 18A:
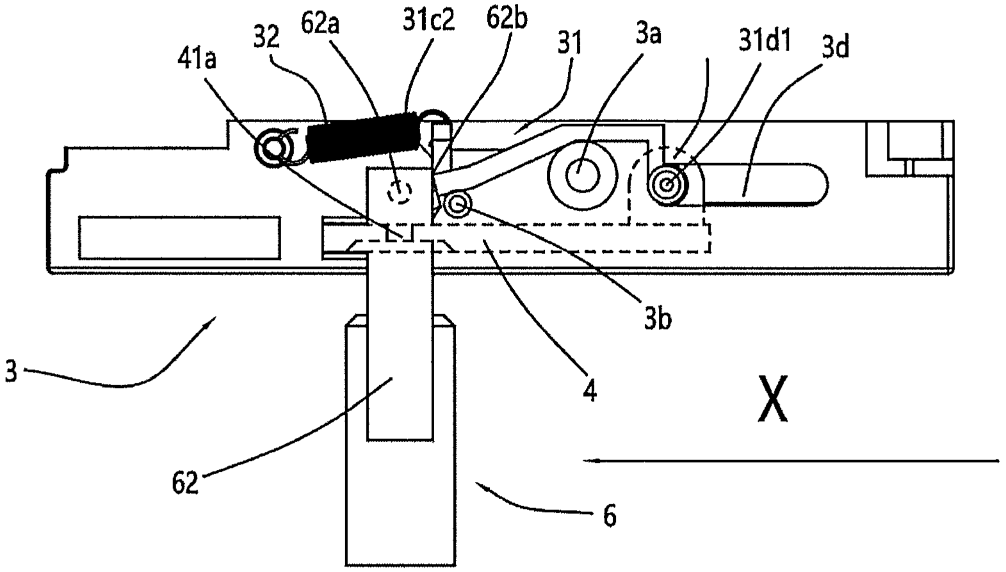
FIG. 18(*a*) is a schematic structural diagram of a lifting portion and a photographic developer receiving portion cooperated in a first state according to some other embodiments of the present disclosure.
Figure 18B:
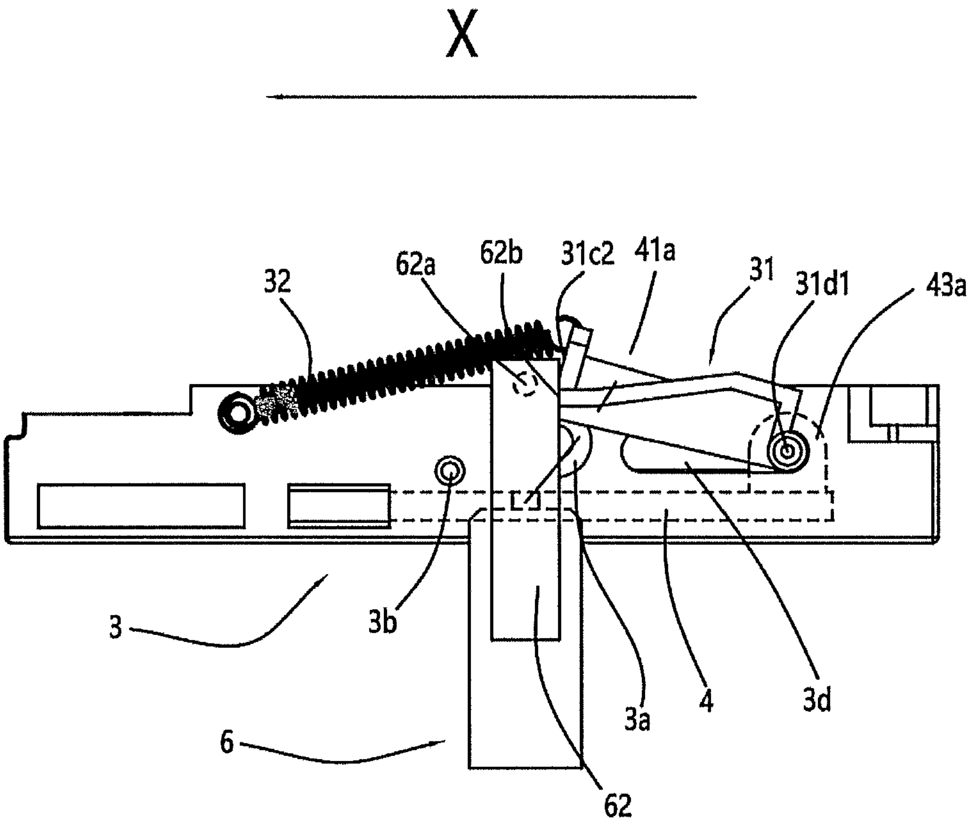
Figure 19:
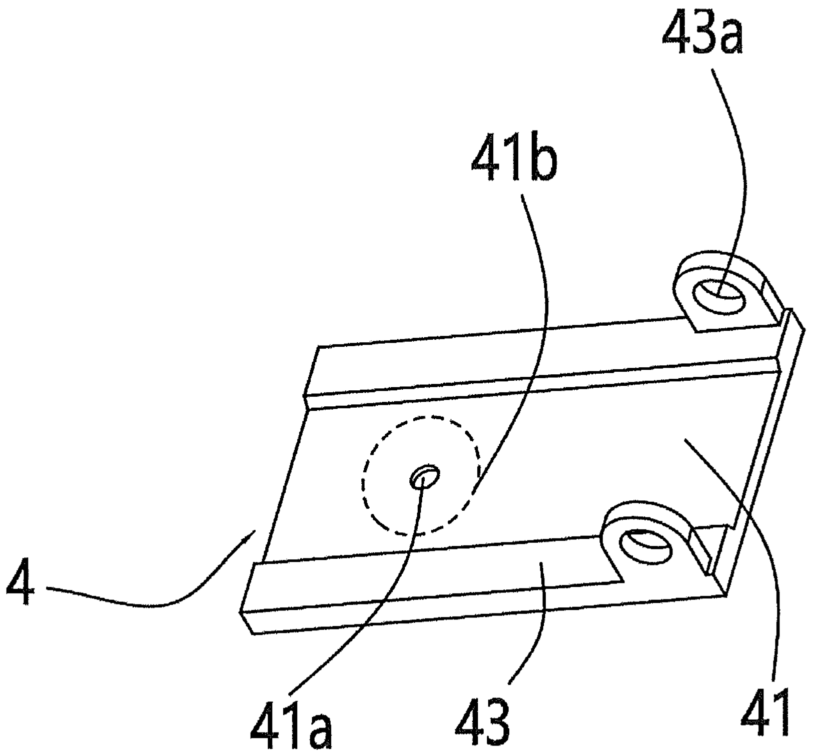
FIG. 19 is a schematic structural diagram of a photographic developer blocking portion according to some other embodiments of the present disclosure.

In other embodiments, to avoid the photographic developer blocking portion 4 stalling with the first stopping part 71 and the second stopping part 72 during the mounting and dismounting processes of the photographic developer container 10, which would prevent the hole 41*a* of the photographic developer blocking portion 4 from forming a fluid communication relationship with the discharge opening 3*g* and the receiving opening 11, in the embodiment, as shown in FIGS. 17 and 19, the photographic developer blocking portion 4 includes a blocking part 41, a hole 41*a*, and a connecting surface 41*b* surrounding the hole 41*a*. A platform portion 43 is arranged on the side portion of the blocking part 41 in the first direction X. A snapped part 31*d*4 is also arranged on the platform portion 43 in the third direction Z. Furthermore, a snapping part 31*d*4 is provided on the driving portion 31*d*1 of the lifting portion 31.

Figure 16A:
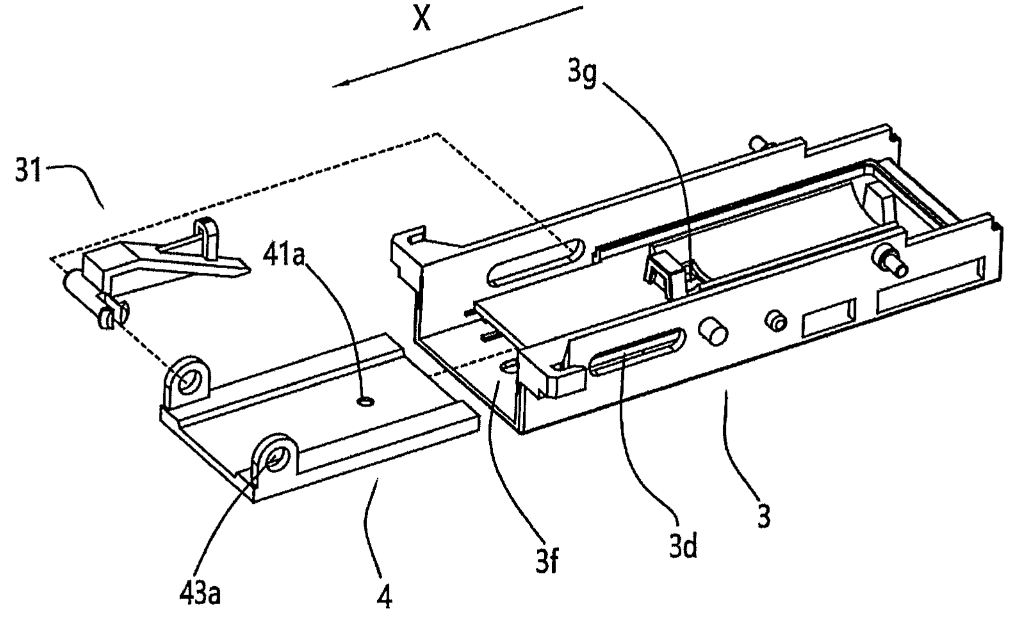
FIG. 16(*a*) is a schematic diagram of a first structure of a lifting portion of a photographic developer container being mounted to the photographic developer discharge portion according to some other embodiments of the present disclosure.
Figure 16B:
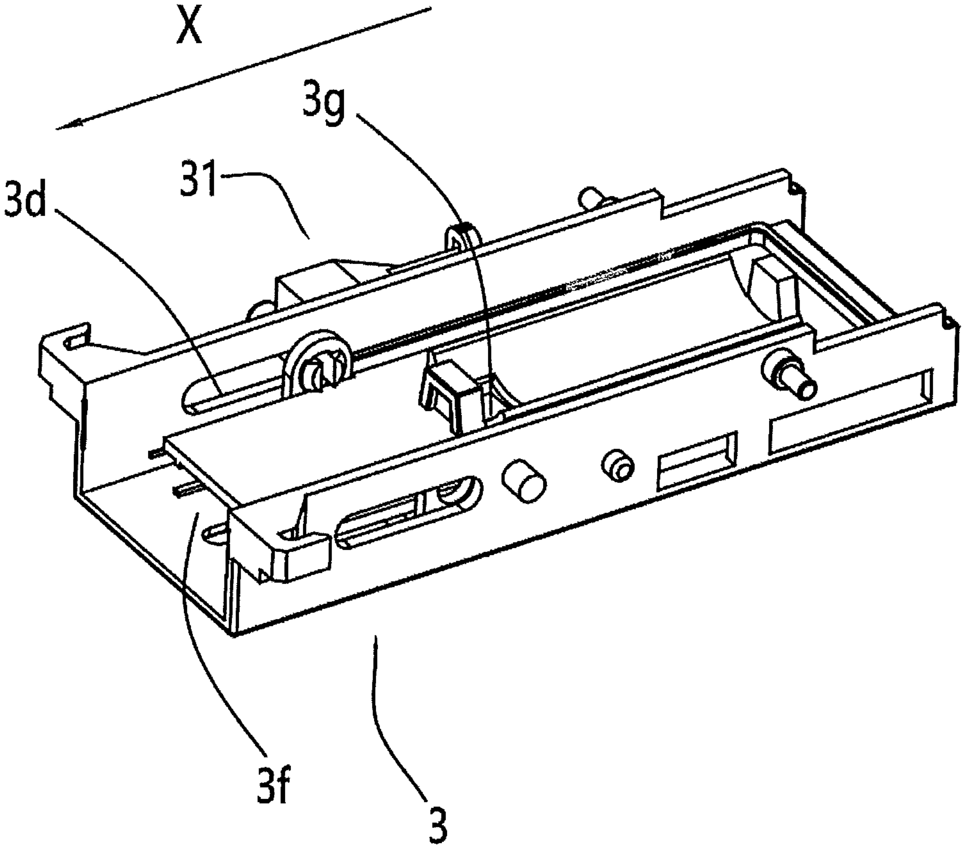
Figure 16C:
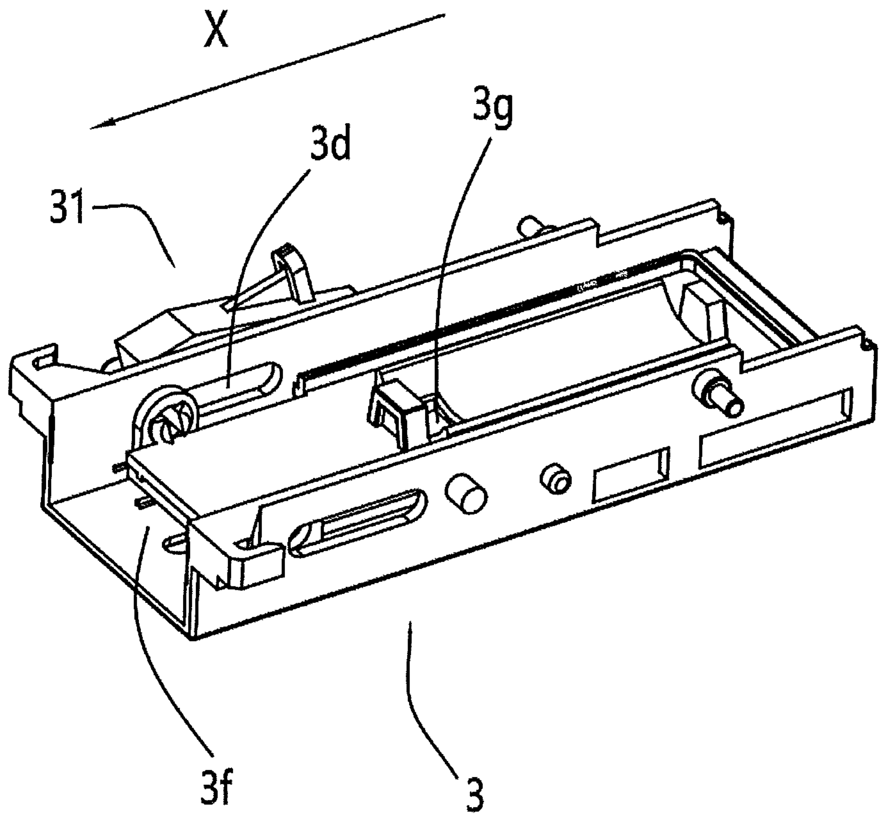

Specifically, as shown in FIGS. 16(*a*)-16(*c*), 18(*a*), and 18(*b*), the photographic developer blocking portion 4 is mounted to the cavity 3*f* of the photographic developer discharge portion 3 through the platform portion 43. The snapping part 31*d*4 of the lifting portion 31 passes through the displacement portion 3*d* and snaps into the snapped part 31*d*4. Furthermore, the moving position of the photographic developer discharge portion 3, located at the displacement portion 3*d*, is provided with a slot (not shown) to facilitate the movement of the snapped part 31*d*4 in the first direction X. When the lifting portion 31 and the photographic developer receiving portion 6 push the photographic developer container 10 into the image-forming apparatus along the first direction X as described above, the lifting portion 31 will move and rotate relative to the photographic developer discharge portion 3. Since the lifting portion 31 and the photographic developer blocking portion 4 are linked, the movement of the lifting portion 31 will drive the photographic developer blocking portion 4 to move in the first direction X within the cavity 3*f*, causing the receiving opening 11, the hole 41*a*, and the discharge opening 3*g* to fluidly communicate. This prevents poor inner cooperation between the photographic developer blocking portion 4 and the image-forming apparatus during the mounting and dismounting of the photographic developer container 10, which could cause the photographic developer in the photographic developer container 10 to fail to enter the image-forming apparatus so as to not be able to ensure the normal operation of the image-forming apparatus.

It should be noted that in the embodiments of the present disclosure, the specific structure and technical effects of the photographic developer container can be referred to in the description above concerning the chip, and will not be repeated here.

There are a number of points that need to be clarified.

(1) The drawings of the embodiments of the present disclosure relate only to the structures involved in the embodiments of the present disclosure, and reference may be made to the usual designs for other structures.

(2) Without conflict, the embodiments and features in embodiments of the present disclosure may be combined with each other to obtain new embodiments.

The foregoing is only a specific embodiment of the present disclosure, but the scope of protection of the present disclosure is not limited thereto, and the scope of protection of the present disclosure shall be subject to the scope of protection of the claims.

What is claimed is:

1. A photographic developer container, wherein the photographic developer container can be detachably mounted to a photographic developer receiving portion located within an image-forming apparatus; the photographic developer receiving portion comprises a receiving opening for receiving a photographic developer, a binding portion capable of integrally displacing with the photographic developer receiving portion, and an abutting portion that supports the binding portion, wherein the photographic developer container comprises:

a photographic developer container body configured for containing the photographic developer and capable of rotating around a first rotation axis;

a photographic developer discharge portion arranged with a discharge opening configured for discharging the photographic developer of the photographic developer container body;

a photographic developer blocking portion arranged with a hole that can communicate with the discharge opening and configured to open and close the discharge opening along with a mounting and dismounting operation of the photographic developer container;

a displacement portion extending along a first direction of the photographic developer discharge portion;

a guiding portion extending along a second direction of the photographic developer discharge portion; and a lifting portion capable of cooperating with the photographic developer receiving portion, such that the lifting portion moves a predetermined distance in the first direction, and the lifting portion rotates around itself at a predetermined angle, causing the receiving opening to fluidly communicate with the discharge opening.

2. The photographic developer container according to claim 1, further comprising a resetting portion, connected to the lifting portion and configured to enable resetting of the lifting portion along with the dismounting operation of the photographic developer container.

3. The photographic developer container according to claim 1, wherein the predetermined distance is equal to a distance of movement of the binding portion cooperating with the displacement portion through the lifting portion from a first state to a third state.

4. The photographic developer container according to claim 1, wherein the predetermined angle is equal to an offset angle of the binding portion cooperating with the guiding portion through the lifting portion from a first state to a third state.

5. The photographic developer container according to claim 1, wherein the photographic developer blocking portion is connected to the lifting portion, so that the lifting portion drives the photographic developer blocking portion to move, thereby causing the photographic developer blocking portion to move to a position where the hole and the receiving opening are communicated so that the discharge opening and the receiving opening are communicated.

6. The photographic developer container according to claim 5, wherein the lifting portion is connected with a snapping part, the snapping part is provided at a moving end of the lifting portion and extends in the second direction towards the discharge opening; and the photographic developer blocking portion further comprises a snapped part configured to cooperate with the snapping part, so that the lifting portion drives the photographic developer blocking portion to move in the first direction.

7. The photographic developer container according to claim 6, wherein the snapping part and the lifting portion are integrally molded.

8. The photographic developer container according to claim 1, wherein the photographic developer blocking portion is connected to the lifting portion, so that the photographic developer blocking portion drives the lifting portion to move, thus causing the photographic developer blocking portion to move to a position where the hole and the receiving opening are in a communicating state so that the discharge opening and the receiving opening are communicated.

9. The photographic developer container according to claim 8, wherein the lifting portion is connected with a pushing portion provided at a moving end of the lifting portion and extends in a third direction towards a horizontal plane of the discharge opening; and the photographic developer blocking portion further comprises a pushing member configured to cooperate with the pushing portion, so that the photographic developer blocking portion drives the lifting portion to move in the first direction.

10. The photographic developer container according to claim 9, wherein the pushing portion and the lifting portion are integrally molded.

11. An image-forming apparatus, comprising a photographic developer receiving portion and the photographic developer container according to claim 1; and the photographic developer container is detachably mounted on the photographic developer receiving portion.

* * * * *